(12) United States Patent
Liu et al.

(10) Patent No.: US 12,166,678 B2
(45) Date of Patent: Dec. 10, 2024

(54) PATH TRAFFIC ALLOCATION METHOD, NETWORK DEVICE, AND NETWORK SYSTEM

(71) Applicant: HUAWEI TECHNOLOGIES CO., LTD., Guangdong (CN)

(72) Inventors: Dawei Liu, Beijing (CN); Wenjie Liu, Beijing (CN); Liang Cheng, Beijing (CN); Dongfeng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 17/704,175

(22) Filed: Mar. 25, 2022

(65) Prior Publication Data

US 2022/0217089 A1 Jul. 7, 2022

Related U.S. Application Data

(63) Continuation of application No. PCT/CN2020/116515, filed on Sep. 21, 2020.

(30) Foreign Application Priority Data

Sep. 27, 2019 (CN) .......................... 201910922263.0

(51) Int. Cl.
*H04L 47/125* (2022.01)
*H04L 43/0882* (2022.01)
(Continued)

(52) U.S. Cl.
CPC ........ *H04L 47/125* (2013.01); *H04L 43/0882* (2013.01); *H04L 45/70* (2013.01); *H04L 47/2416* (2013.01)

(58) Field of Classification Search
CPC ... H04L 47/125; H04L 43/0882; H04L 45/70; H04L 47/20; H04L 45/124; H04L 43/106; H04L 47/283; H04L 47/2441
See application file for complete search history.

(56) References Cited

U.S. PATENT DOCUMENTS

2005/0270972 A1* 12/2005 Kodialam ............... H04L 45/04
370/216
2009/0219938 A1* 9/2009 So ......................... H04L 45/302
370/395.3
(Continued)

FOREIGN PATENT DOCUMENTS

CN 101616061 A 12/2009
CN 101938484 A 1/2011
(Continued)

OTHER PUBLICATIONS

Songyang Zhang et al: "An Optimized BBR for Multipath Real Time Video Streaming", arxiv.org, Cornell University Library, 201 OLIN Libratiy Cornell University Ithaca, NY 14853, Jan. 26, 2019 (Jan 26, 2019), XP081008500, 14 pages.

*Primary Examiner* — Oussama Roudani
(74) *Attorney, Agent, or Firm* — HUAWEI TECHNOLOGIES CO., LTD.

(57) ABSTRACT

Embodiments of this application disclose path traffic allocation methods and network devices. One of the disclosed path traffic allocation methods includes sending, by an ingress node, a measurement packet to an egress node on each of at least two paths, where the at least two paths are paths between the ingress node and the egress node, and the measurement packet on each path indicates path information of each path. The disclosed method further includes receiving, by the ingress node, a response packet from the egress node, where the response packet indicates traffic adjustment information of each path, and determining, by the ingress node, to-be-sent traffic on each path based on the traffic adjustment information of each path.

18 Claims, 8 Drawing Sheets

(51) Int. Cl.
*H04L 45/00* (2022.01)
*H04L 47/2416* (2022.01)

(56) References Cited

U.S. PATENT DOCUMENTS

| | | | | |
|---|---|---|---|---|
| 2011/0141891 | A1* | 6/2011 | So | H04L 47/267 |
| | | | | 370/235 |
| 2015/0304066 | A1* | 10/2015 | Dutti | H04B 10/27 |
| | | | | 398/98 |
| 2018/0331955 | A1 | 11/2018 | Ju et al. | |
| 2019/0363963 | A1* | 11/2019 | Nilsson | H04L 47/28 |
| 2021/0176666 | A1* | 6/2021 | Ayadurai | H04L 47/41 |

FOREIGN PATENT DOCUMENTS

| | | | |
|---|---|---|---|
| CN | 103650435 | A | 3/2014 |
| CN | 104092628 | A | 10/2014 |
| CN | 104967571 | A | 10/2015 |
| CN | 106817299 | A | 6/2017 |
| CN | 107204933 | A | 9/2017 |
| CN | 108107730 | A | 6/2018 |
| CN | 109600322 | A | 4/2019 |
| WO | 2015021615 | A1 | 2/2015 |

* cited by examiner

PATH TRAFFIC ALLOCATION METHOD, NETWORK DEVICE, AND NETWORK SYSTEM

CROSS-REFERENCE TO RELATED APPLICATIONS

This application is a continuation of International Application No. PCT/CN2020/116515, filed on Sep. 21, 2020, which claims priority to Chinese Patent Application No. 201910922263.0, filed on Sep. 27, 2019. The disclosures of the aforementioned applications are hereby incorporated by reference in their entireties.

TECHNICAL FIELD

This application relates to the field of communication technologies, and more specifically, to a path traffic allocation method, a network device, and a network system.

BACKGROUND

In a network, a conventional path load balancing method mainly focuses on whether sending traffic on a plurality of paths between an ingress node and an egress node is balanced, to ensure load balancing of paths in the network. Although the conventional path load balancing method can ensure load balancing of paths between the ingress node and the egress node, this method may cause a case in which some links in the network are overloaded and some links are underloaded. Therefore, load balancing of links in the network cannot be ensured. Refer to FIG. 1. FIG. 1 is a schematic diagram of a network according to an embodiment of this application. The following describes a problem of a conventional path load balancing method by using an example shown in FIG. 1.

In the example shown in FIG. 1, it is assumed that there are three optimal paths between an ingress node A and an egress node D, and the three optimal paths are a path 1, a path 2, and a path 3. The path 1 is the ingress node A->an intermediate node B1->an intermediate node C1->the egress node D. The path 2 is the ingress node A->an intermediate node B2->the intermediate node C1->the egress node D. The path 3 is the ingress node A->an intermediate node B3->an intermediate node C2->the egress node D. In FIG. 1, every two adjacent nodes are connected through a link. It is assumed that bandwidths of links C1-D and C2-D in FIG. 1 are 2 GB.

In the example shown in FIG. 1, the conventional path load balancing method evenly distributes traffic on the three paths in a sequential manner or a hash manner. It is assumed that 1 GB of sending traffic is allocated to the three paths in the conventional path load balancing method. Because the path 1 and the path 2 overlap at the link C1-D, sending traffic on the link C1-D is 2 GB. Because path 3 passes through the link C2-D, and no other path passes through the link C2-D, sending traffic on the link C2-D is 1 GB. In this case, link utilization of the link C1-D=the sending traffic on the link C1-D/a bandwidth of the link C1-D=2 GB/2 GB=100%, and link utilization of the link C2-D=sending traffic on the link C2-D/a bandwidth of the link C2-D=1 GB/2 GB=50%.

In the example shown in FIG. 1, the link utilization of the link C1-D is 100%, which indicates that the link C1-D is overloaded. Therefore, congestion or packet loss may occur on the link C1-D. However, the link utilization of the link C2-D is 50%, which indicates that the link C2-D is underloaded. Therefore, the link C2-D is not fully utilized.

Therefore, it can be learned from the foregoing description that, in the conventional path load balancing method, some links in the network may be overloaded, and some links in the network may be underloaded. Therefore, load balancing of links in the network cannot be ensured.

SUMMARY

Embodiments of this application provide a path traffic allocation method and a network device, so that load of links in a network is more balanced.

According to a first aspect, an embodiment of this application provides a path traffic allocation method. The method includes: An ingress node sends a measurement packet to an egress node on each of at least two paths. The at least two paths are paths between the ingress node and the egress node. The measurement packet on each path is used to indicate path information of each path. The ingress node receives a response packet sent by the egress node. The response packet is used to indicate traffic adjustment information of each path. The ingress node determines to-be-sent traffic on each path based on the traffic adjustment information of each path.

In the first aspect, in a network, the ingress node may collaborate with an intermediate node and the egress node, so that the ingress node learns of a load status of a link in the network, and the ingress node can allocate sending traffic to each path. This ensures that load of links in the network is more balanced.

In a possible implementation, the response packet includes a traffic adjustment amount of each path, and the traffic adjustment amount of each path is used to indicate traffic that needs to be adjusted on each path. That the ingress node determines to-be-sent traffic on each path based on the traffic adjustment information of each path includes: The ingress node obtains initial sending traffic on each path; and the ingress node determines the to-be-sent traffic on each path based on the traffic adjustment amount of each path and the initial sending traffic on each path.

In a possible implementation, the response packet includes allocated traffic on each path, and the allocated traffic on each path is used to indicate sending traffic on a link of each path. That the ingress node determines to-be-sent traffic on each path based on the traffic adjustment information of each path includes: The ingress node obtains initial sending traffic on each path; the ingress node determines a traffic adjustment amount of each path based on the initial sending traffic on each path and the allocated traffic on each path; and the ingress node determines the to-be-sent traffic on each path based on the traffic adjustment amount of each path and the initial sending traffic on each path.

In a possible implementation, the response packet includes optimal utilization of each path and a fair bandwidth of each path. The fair bandwidth of each path is used to indicate a bandwidth allocated to each path, and the optimal utilization of each path is used to indicate a ratio of sending traffic on each path to the fair bandwidth of each path. That the ingress node determines to-be-sent traffic on each path based on the traffic adjustment information of each path includes: The ingress node determines the allocated traffic on each path based on the optimal utilization of each path and the fair bandwidth of each path; the ingress node obtains the initial sending traffic on each path; the ingress node determines the traffic adjustment amount of each path based on the initial sending traffic on each path and the allocated traffic on each path; and the ingress node determines the to-be-sending traffic based on the traffic adjustment amount of each path and the initial sending traffic on each path.

In a possible implementation, the response packet includes the fair bandwidth of each path, and that the ingress node determines to-be-sent traffic on each path based on the traffic adjustment information of each path includes: The ingress node obtains the initial sending traffic on each path; the ingress node determines the optimal utilization of each path based on the initial sending traffic on each path and the fair bandwidth of each path; the ingress node determines the allocated traffic on each path based on the optimal utilization of each path and the fair bandwidth of each path; the ingress node determines the traffic adjustment amount of each path based on the initial sending traffic on each path and the allocated traffic on each path; and the ingress node determines the to-be-sent traffic on each path based on the traffic adjustment amount of each path and the initial sending traffic on each path.

In a possible implementation, the response packet includes receiving traffic on each path and information about a link of each path. The link is a link with maximum link utilization on the path. The link utilization is a ratio of sending traffic on the link to a bandwidth of the link. That the ingress node determines to-be-sent traffic on each path based on the traffic adjustment information of each path includes: The ingress node determines the fair bandwidth of each path based on the receiving traffic on each path and the information about the link of each path; the ingress node obtains the initial sending traffic on each path; the ingress node determines the optimal utilization of each path based on the initial sending traffic on each path and the fair bandwidth of each path; the ingress node determines the allocated traffic on each path based on the optimal utilization of each path and the fair bandwidth of each path; the ingress node determines the traffic adjustment amount of each path based on the initial sending traffic on each path and the allocated traffic on each path; and the ingress node determines the to-be-sent traffic on each path based on the traffic adjustment amount of each path and the initial sending traffic on each path.

In a possible implementation, the information about the link of each path includes the sending traffic on the link of each path and the bandwidth of the link of each path, or the information about the link of each path includes link utilization of the link of each path.

In a possible implementation, determining to-be-sent traffic on a first path includes: The ingress node calculates a sum of a traffic adjustment amount of the first path and initial sending traffic on the first path to obtain the to-be-sent traffic on the first path. The first path is any path of the at least two paths.

In a possible implementation, determining the traffic adjustment amount of the first path includes: The ingress node calculates a difference between allocated traffic on the first path and the initial sending traffic on the first path to obtain the traffic adjustment amount of the first path. The first path is any path of the at least two paths.

In a possible implementation, determining the allocated traffic on the first path includes: The ingress node calculates a product of optimal utilization of each path and a fair bandwidth of the first path to obtain the allocated traffic on the first path. The first path is any path of the at least two paths.

In a possible implementation, determining the optimal utilization of each path includes: The ingress node calculates a sum of initial sending traffic on all paths to obtain total sending traffic; the ingress node calculates a sum of fair bandwidths of all the paths to obtain a total fair bandwidth; and the ingress node calculates a quotient of the total sending traffic and the total fair bandwidth to obtain the optimal utilization of each path.

In a possible implementation, determining the fair bandwidth of a first path includes: The ingress node calculates a quotient of receiving traffic on the first path and sending traffic on a link of the first path to obtain a first ratio, where the first path is any path of the at least two paths; and the ingress node calculates a product of the first ratio and a bandwidth of the first path to obtain the fair bandwidth of the first path.

In a possible implementation, the determining the fair bandwidth of the first path includes: The ingress node calculates a quotient of the receiving traffic on the first path and link utilization of the link of the first path to obtain the fair bandwidth of the first path.

In a possible implementation, the measurement packet includes sending traffic on a link and a bandwidth of the link. The sending traffic on the link is accumulated sending traffic on the link in a first time period, and the bandwidth of the link is a bandwidth of the link in the first time period. Alternatively, the measurement packet includes link utilization of the link. The link utilization is a ratio of the sending traffic on the link to the bandwidth of the link. Alternatively, the measurement packet includes the sending traffic on the link and the bandwidth of the link, and the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp. Alternatively, the measurement packet includes the link utilization of the link, and the measurement packet further includes at least one of the initial sending traffic on the path, the path identifier, or the first timestamp.

In a possible implementation, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

According to a second aspect, an embodiment of this application provides a path traffic allocation method. The method includes: An intermediate node receives a measurement packet on a first path of at least two paths. The at least two paths are paths between an ingress node and an egress node, and the measurement packet is used to indicate information about a first link of the first path. The intermediate node obtains information about a second link. The second link is a link connected to an egress port of the intermediate node on the first path. When the intermediate node determines, based on the information about the first link and the information about the second link, that link utilization of the first link is greater than or equal to link utilization of the second link, the intermediate node sends the measurement packet to the egress node. Link utilization is used to indicate traffic usage of a link. When the intermediate node determines, based on the information about the first link and the information about the second link, that the link utilization of the first link is less than the link utilization of the second link, the intermediate node fills the information about the second link in the measurement packet, and the intermediate node sends the measurement packet to the egress node.

In the second aspect, in a network, the intermediate node may collaborate with the ingress node and the egress node, so that the ingress node learns of a load status of a link in the network, and the ingress node can allocate sending traffic to each path. This ensures that load of links in the network is more balanced.

In a possible implementation, the information about the first link includes sending traffic on the first link and a bandwidth of the first link, and the information about the second link includes sending traffic on the second link and a bandwidth of the second link; or the information about the first link includes the link utilization of the first link, and the information about the second link includes the link utilization of the second link.

In a possible implementation, after a first intermediate node sends a second measurement packet to the egress node, the method further includes: The first intermediate node deletes a first measurement packet.

In a possible implementation, the first measurement packet further includes at least one of a path identifier of the first path, a timestamp, or initial sending traffic on the first path. The timestamp is a sending time of the first measurement packet, and the second measurement packet further includes at least one of the path identifier of the first path, the timestamp, or the initial sending traffic on the first path.

In a possible implementation, the measurement packet includes sending traffic on a link and a bandwidth of the link. The sending traffic on the link is accumulated sending traffic on the link in a first time period, and the bandwidth of the link is a bandwidth of the link in the first time period. Alternatively, the measurement packet includes link utilization of the link. The link utilization is a ratio of the sending traffic on the link to the bandwidth of the link. Alternatively, the measurement packet includes the sending traffic on the link and the bandwidth of the link, and the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp. Alternatively, the measurement packet includes the link utilization of the link, and the measurement packet further includes at least one of the initial sending traffic on the path, the path identifier, or the first timestamp.

According to a third aspect, an embodiment of this application provides a path traffic allocation method. The method includes: An egress node receives a measurement packet sent by an ingress node on each of at least two paths. The at least two paths are paths between the ingress node and the egress node, and the measurement packet on each path is used to indicate path information of each path. The egress node generates a response packet based on the path information of each path and receiving traffic on each path. The response packet is used to indicate traffic adjustment information of each path. The egress node sends the response packet to the ingress node.

In the third aspect, in a network, the egress node may collaborate with the ingress node and the intermediate node, so that the ingress node learns of a load status of a link in the network, and the ingress node can allocate sending traffic to each path. This ensures that load of links in the network is more balanced.

In a possible implementation, the measurement packet includes sending traffic on a link and a bandwidth of the link. The sending traffic on the link is accumulated sending traffic on the link in a first time period, and the bandwidth of the link is a bandwidth of the link in the first time period. Alternatively, the measurement packet includes link utilization of the link. The link utilization is a ratio of the sending traffic on the link to the bandwidth of the link. Alternatively, the measurement packet includes the sending traffic on the link and the bandwidth of the link, and the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp. Alternatively, the measurement packet includes the link utilization of the link, and the measurement packet further includes at least one of the initial sending traffic on the path, the path identifier, or the first timestamp.

In a possible implementation, the response packet includes information about a link of each path and the receiving traffic on each path.

In a possible implementation, that the egress node generates a response packet based on the path information of each path and receiving traffic on each path includes: The egress node determines a fair bandwidth of each path based on the information about the link of each path and the receiving traffic on each path, and the egress node generates the response packet. The response packet includes the fair bandwidth of each path.

In a possible implementation, that the egress node generates a response packet based on the path information of each path and receiving traffic on each path includes: The egress node determines the fair bandwidth of each path based on the information about the link of each path and the receiving traffic on each path; the egress node obtains initial sending traffic on each path; the egress node determines optimal utilization of each path based on the initial sending traffic on each path and the fair bandwidth of each path; and the egress node generates the response packet. The response packet includes the optimal utilization of each path and the fair bandwidth of each path.

In a possible implementation, that the egress node generates a response packet based on the path information of each path and receiving traffic on each path includes: The egress node determines a fair bandwidth of each path based on information about a link of each path and the receiving traffic on each path; the egress node obtains initial sending traffic on each path; the egress node determines optimal utilization of each path based on the initial sending traffic on each path and the fair bandwidth of each path; the egress node determines allocated traffic on each path based on the optimal utilization of each path and the fair bandwidth of each path; and the egress node generates the response packet. The response packet includes the allocated traffic on each path.

In a possible implementation, that the egress node generates a response packet based on the path information of each path and receiving traffic on each path includes: The egress node determines a fair bandwidth of each path based on information about a link of each path and the receiving traffic on each path; the egress node obtains initial sending traffic on each path; the egress node determines optimal utilization of each path based on the initial sending traffic on each path and the fair bandwidth of each path; the egress node determines allocated traffic on each path based on the optimal utilization of each path and the fair bandwidth of each path; the egress node determines a traffic adjustment amount of each path based on the initial sending traffic on each path and the allocated traffic on each path; and the egress node generates the response packet. The response packet includes the traffic adjustment amount of each path.

In a possible implementation, the path information of each path includes sending traffic on the link of each path and a bandwidth of the link of each path, or the path information of each path includes link utilization of the link of each path.

In a possible implementation, determining a fair bandwidth of a first path includes: The egress node determines the fair bandwidth of the first path based on link information of the first path and receiving traffic on the first path by calculation. The first path is any path of the at least two paths.

In a possible implementation, determining the optimal utilization of each path includes: The egress node calculates a sum of initial sending traffic on all paths to obtain total sending traffic; the egress node calculates a sum of fair bandwidths of all the paths to obtain a total fair bandwidth; and the egress node calculates a quotient of the total sending traffic and the total fair bandwidth to obtain the optimal utilization of each path.

In a possible implementation, determining allocated traffic on the first path includes: The egress node calculates a product of the optimal utilization of each path and the fair bandwidth of the first path to obtain the allocated traffic on the first path. The first path is any path of the at least two paths.

In a possible implementation, determining traffic adjustment amount of the first path includes: The egress node calculates a difference between the allocated traffic on the first path and initial sending traffic on the first path to obtain the traffic adjustment amount of the first path. The first path is any path of the at least two paths.

In a possible implementation, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

According to a fourth aspect, an embodiment of this application provides a network device. The network device has functions of implementing behaviors of the network device in the method in any one of the first aspect, the possible implementations of the first aspect, the second aspect, the possible implementations of the second aspect, the third aspect, or the possible implementations of the third aspect. The functions may be implemented by hardware, or may be implemented by hardware executing corresponding software. The hardware or the software includes one or more modules corresponding to the functions. Optionally, the network device may be a router.

According to a fifth aspect, an embodiment of this application provides a network device. The network device includes a processor and a memory. The processor is configured to: read software code stored in the memory and perform the method in any one of the first aspect or the possible implementations of the first aspect, or enable a computer or the processor to perform the method in any one of the second aspect or the possible implementations of the second aspect, or enable a computer or the processor to perform the method in any one of the third aspect or the possible implementations of the third aspect.

According to a sixth aspect, an embodiment of this application provides a computer-readable storage medium. The computer-readable storage medium stores instructions. When the instructions are run on a computer, the computer is enabled to perform the method in any one of the first aspect or the possible implementations of the first aspect, or the computer or a processor is enabled to perform the method in any one of the second aspect or the possible implementations of the second aspect, or the computer or a processor is enabled to perform the method in any one of the third aspect or the possible implementations of the third aspect.

According to a seventh aspect, a computer program product including instructions is provided. When the computer program product is run on a computer or a processor, the computer or the processor is enabled to perform the method in any one of the first aspect or the possible implementations of the first aspect, or the computer or the processor is enabled to perform the method in any one of the second aspect or the possible implementations of the second aspect, or the computer or the processor is enabled to perform the method in any one of the third aspect or the possible implementations of the third aspect.

According to an eighth aspect, an embodiment of this application provides a network system. The network system includes an ingress node, an intermediate node, and an egress node. The ingress node is configured to perform the method in any one of the first aspect or the possible implementations of the first aspect, the intermediate node is configured to perform the method in any one of the second aspect or the possible implementations of the second aspect, and the egress node is configured to perform the method in any one of the third aspect or the possible implementations of the third aspect.

In embodiments of this application, the ingress node, the intermediate node, and the egress node collaborate with each other, so that the ingress node can learn of the load status of the link in the network, and the ingress node can allocate sending traffic to each path. This ensures that load of links in the network is more balanced.

DESCRIPTION OF EMBODIMENTS

A path traffic allocation method provided in embodiments of this application may be applied to an ingress node, an intermediate node, and an egress node in a network. The ingress node, the intermediate node, and the egress node may be network devices that have a routing and forwarding function, such as routers. In embodiments of this application, the ingress node, the intermediate node, and the egress node collaborate with each other, so that the ingress node can learn of a load status of a link in the network, and the ingress node can allocate sending traffic to each path. This ensures that load of links in the network is more balanced. The following describes an implementation of this application by using a specific application scenario.

Figure 1:
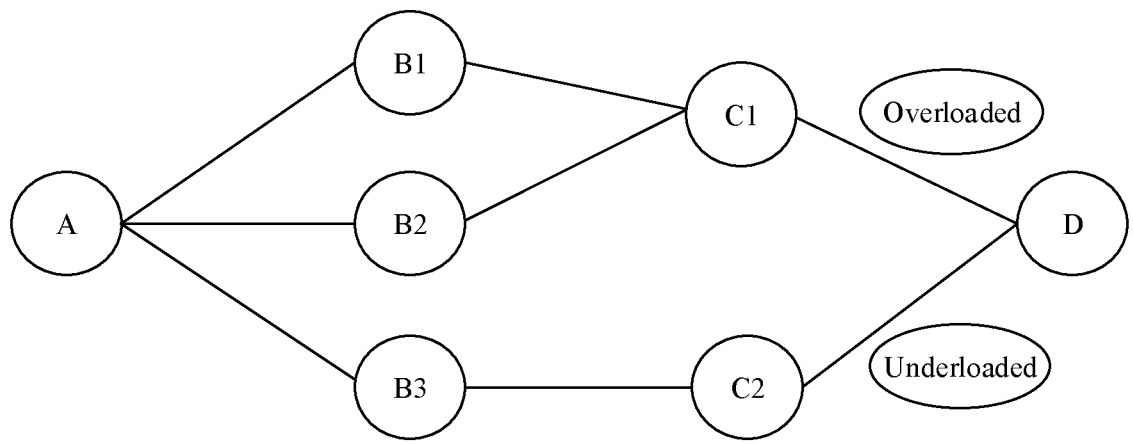
FIG. 1 is a schematic diagram of a network according to an embodiment of this application.
Figure 2:
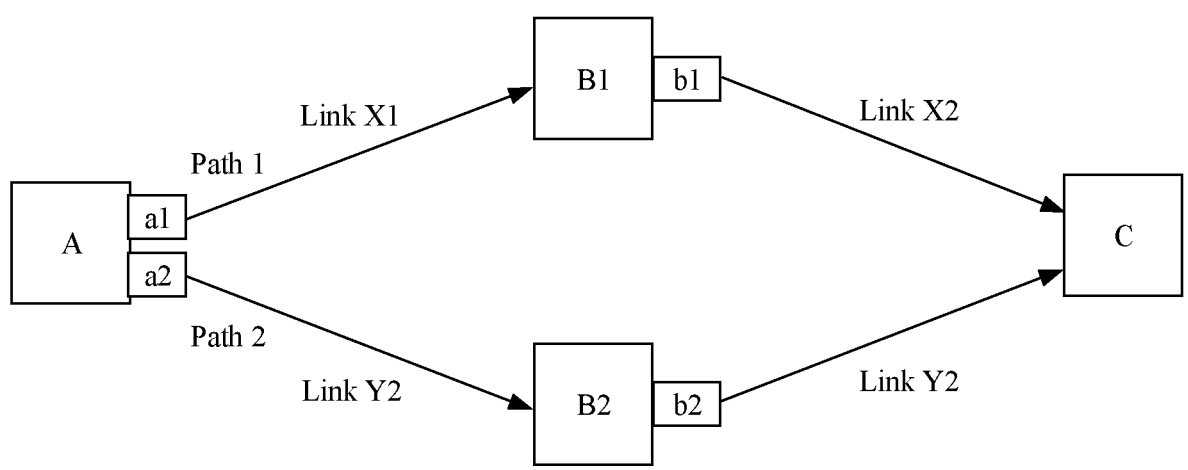
FIG. 2 is a schematic diagram of another network according to an embodiment of this application.

FIG. 2 is a schematic diagram of another network according to an embodiment of this application. The network shown in FIG. 2 includes an ingress node A, an intermediate node B1, an intermediate node B2, and an egress node C. There are two paths a path 1 and a path 2 between the ingress node A and the egress node C. For example, the path 1 is the node A->the node B1->the node C, and the path 2 is the node A->the node B2->the node C. The path 1 passes through a link X1 and a link X2. The link X1 is a link between an egress port a1 of the node A and the node B1. The link X2 is a link between an egress port b1 of the node B1 and the node C. The path 2 passes through a link Y1 and a link Y2. The link Y1 is a link between an egress port a2 of the node A and the node B2. The link Y2 is a link between an egress port b2 of the node B2 and the node C.

In the embodiment shown in FIG. 2, it is assumed that a bandwidth B11 of the link X1=a bandwidth B12 of the link X2=1000 MB, sending traffic U11 of the link X1=600 MB, sending traffic U12 on the link X2=800 MB, the ingress node A collects statistics about initial sending traffic S1 on the path 1=300 MB, and the egress node C collects statistics about receiving traffic R1 on the path 1=300 MB.

In the embodiment shown in FIG. 2, it is assumed that a bandwidth B21 of the link Y1=a bandwidth B22 of the link Y2=2000 MB, sending traffic U21 of the link Y1=1400 MB, sending traffic U22 on the link Y2=1500 MB, the ingress node A collects statistics about initial sending traffic S2 on the path 2=900 MB, and the egress node C collects statistics about receiving traffic R2 on the path 2=900 MB.

For example, the sending traffic U11 of the link X1 is accumulated sending traffic on the egress port a1 of the ingress node A in a first time period, the sending traffic U12 on the link X2 is accumulated sending traffic on the egress port b1 of the ingress node B1 in the first time period, the sending traffic U21 of the link Y1 is accumulated sending traffic on the egress port a2 of the ingress node A in the first time period, and the sending traffic U22 on the link Y2 is accumulated sending traffic on the egress port b2 of the ingress node B2 in the first time period. The first time period is a preset time period. For example, the first time period may be preset to 10 µs, 20 µs, 30 µs, or the like. A person skilled in the art may set the first time period based on an actual situation, and the first time period is not limited to the time length provided in this embodiment of this application.

For example, the initial sending traffic S1 on the path 1 is accumulated sending traffic on the ingress node A on the path 1 in a second time period, and the initial sending traffic S2 on the path 2 is accumulated sending traffic on the ingress node A on the path 2 in the second time period. The receiving traffic R1 on the path 1 is accumulated receiving traffic of the egress node C on the path 1 in a third time period, and the receiving traffic R2 on the path 2 is accumulated receiving traffic of the egress node C on the path 2 in the third time period.

The first time period, the second time period, and the third time period are all preset time periods. For example, the first time period may be set to 10 µs, 20 µs, 30 µs, or the like. For another example, the second time period may be set to 10 ms, 20 ms, 30 ms, or the like. For still another example, the third time period may be set to 10 ms, 20 ms, 30 ms, or the like.

The first time period is a time period in the second time period, and the third time period is later than the second time period. For example, it is assumed that the first time period is 0 to 10 µs, the second time period is 0 to 3 ms, and the third time period is 3 ms to 6 ms.

A person skilled in the art may set the first time period, the second time period, and the third time period based on an actual situation, and the first time period, the second time period, and the third time period are not limited to the time length provided in this embodiment of this application.

Figure 3:
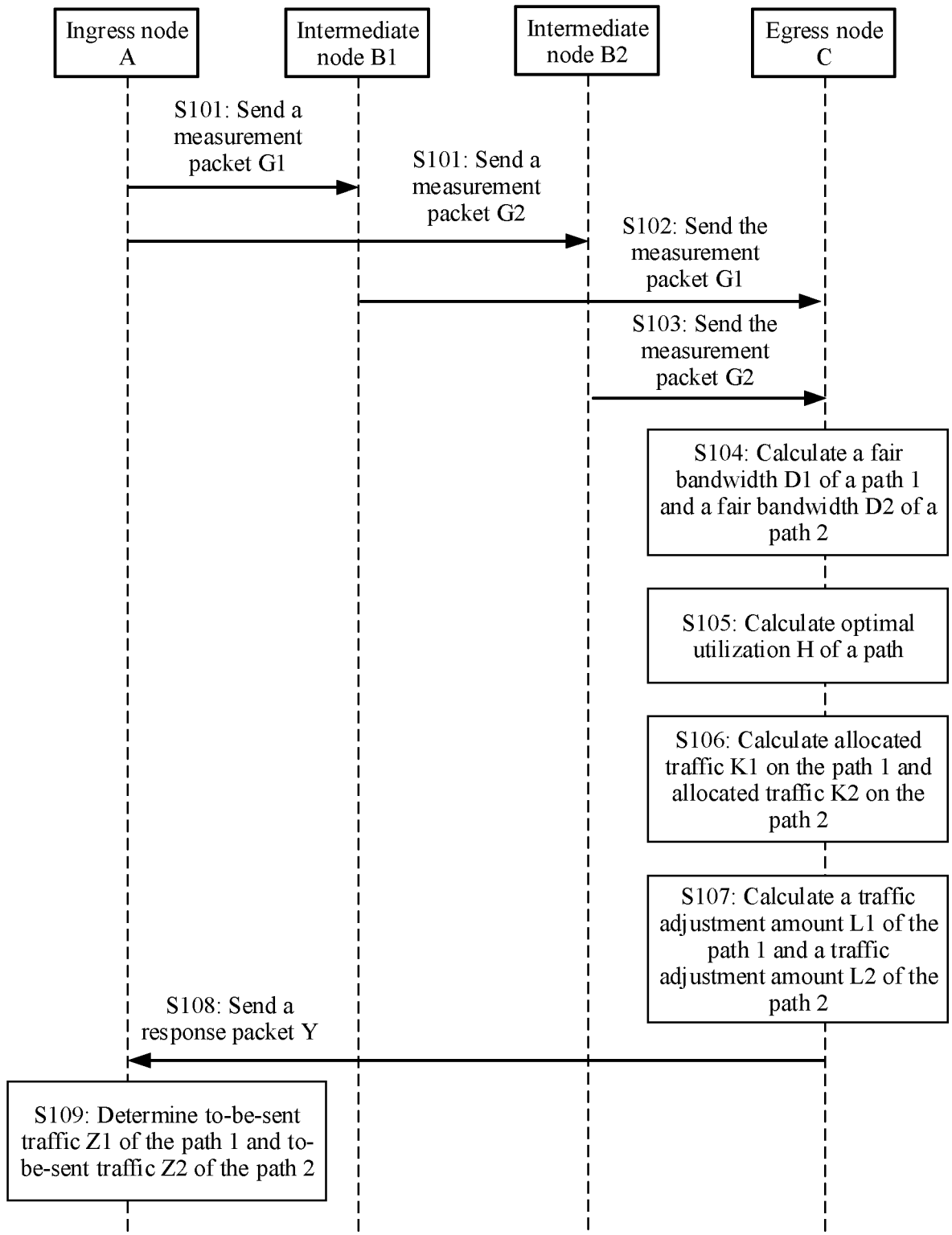
FIG. 3 is a flowchart of a path traffic allocation method according to an embodiment of this application.

Refer to FIG. 2 and FIG. 3. FIG. 3 is a flowchart of a path traffic allocation method according to an embodiment of this application. The path traffic allocation method shown in FIG. 3 may be applied to the network shown in FIG. 2. The path traffic allocation method provided in this embodiment of this application includes the following steps.

S101: The egress port a1 of the ingress node A sends a measurement packet G1 to the egress node C on the path 1, and the egress port a2 of the ingress node A sends a measurement packet G2 to the egress node C on the path 2.

For example, the measurement packet G1 includes the sending traffic U11 (600 MB) on the link X1, the bandwidth B11 (1000 MB) of the link X1, and the initial sending traffic S1 (300 MB) on the path 1. The measurement packet G2 includes the sending traffic U21 (1400 MB) on the link Y1, the bandwidth B21 (2000 MB) of the link Y1, and the initial sending traffic S2 (900 MB) on the path 2.

The ingress node A in this embodiment of this application may fill the initial sending traffic S1 (300 MB) on the path 1 in the second time period (0 to 3 ms) into the measurement packet G1. The initial sending traffic S1 (300 MB) on the path 1 is a difference between accumulated sending traffic on the path 1 at 3 ms and accumulated sending traffic on the path 1 at 0 ms.

The measurement packet G1 may further include a path identifier and a timestamp t1 of the path 1. The timestamp t1 is a sending time of the measurement packet G1. The second time period is 0 to 3 ms, and therefore the timestamp t1 is 3 ms. If the measurement packet G1 includes the timestamp t1, the initial sending traffic S1 (300 MB) on the path 1 is the accumulated sending traffic on the path 1 at 3 ms. Because the ingress node A sends a previous measurement packet G3 on the path 1 at 0 ms, the egress node C may extract initial sending traffic S3 (0 MB) on the path 1 at the $0^{th}$ ms in the measurement packet G3 and the initial sending traffic S1 (300 MB) on the path 1 at the $3^{rd}$ ms in the measurement packet G1, and then the egress node C calculates a difference between the accumulated sending traffic S1 (300 MB) on the path 1 at 3 ms and the accumulated sending traffic S3 (0 MB) at 0 ms, to obtain the initial sending traffic (300 MB) on the path 1 in the second time period (0 to 3 ms).

Similarly, the measurement packet G2 may further include a path identifier and a timestamp t2 of the path 2. The timestamp t2 is a sending time of the measurement packet G2. The second time period is 0 to 3 ms, and therefore the timestamp t2 is 3 ms.

In S101, the ingress node A sends, on each path, the measurement packet to the egress node C, to put information about a link with maximum link utilization on each path into the measurement packet, so that the egress node C can learn of information about a bottleneck link on each path, and reallocate sending traffic to a more appropriate link of each path based on the information about the bottleneck link on each path. The bottleneck link is a link with maximum link utilization on a path.

S102: The intermediate node B1 receives, on the path 1, the measurement packet G1 sent by the egress port a1 of the ingress node A, calculates link utilization H11 (60%) of the link X1 and link utilization H12 (80%) of the link X2, determines that the link utilization H12 (80%) of the link X2 is greater than the link utilization H11 (60%) of the link X1, and fills the sending traffic U12 (800 MB) of the link X2 and the bandwidth B12 of the link X2 (1000 MB) in the measurement packet G1, and the egress port b1 of the intermediate node B1 sends the measurement packet G1 to the egress node C on the path 1.

For example, the link utilization H11 of the link X1=the sending traffic U11 (600 MB) of the link X1/the bandwidth B11 (1000 MB) of the link X1=60%, and the link utilization H12 of the link X2=the sending traffic U12 (800 MB) of the link X2/the bandwidth B12 (1000 MB) of the link X2=80%.

Link utilization of a link is a ratio of sending traffic on the link to a bandwidth of the link, and the link utilization of the link is used to indicate traffic usage of the link. Higher link utilization indicates more traffic uses the link. Lower link utilization indicates less traffic uses the link. Only the link X1 and the link X2 exist on the path 1, and the link utilization H12 of the link X2 is higher than the link utilization H11 of the link X1. This indicates that the link X2 is a link with maximum link utilization on the path 1, and the link X2 is a bottleneck link on the path 1.

S103: The intermediate node B2 receives, on the path 2, the measurement packet G2 sent by the egress port a2 of the ingress node A, calculates link utilization H21 (70%) of the link Y1 and link utilization H22 (75%) of the link Y2, determines that the link utilization H22 (75%) of the link Y2 is greater than the link utilization H21 (70%) of the link Y1, and fills the sending traffic U22 (1500 MB) on the link Y2 and the bandwidth B22 of the link Y2 (2000 MB) in the measurement packet G2, and the egress port b2 of the intermediate node B1 sends the measurement packet G2 to the egress node C on the path 2.

For example, the link utilization H21 of the link Y1=the sending traffic U21 (1400 MB) on the link Y1/the bandwidth B21 (2000 MB) of the link Y1=70%, and the link utilization H22 of the link Y2=the sending traffic U22 (1500 MB) of the link Y2/the bandwidth B22 (2000 MB) of the link Y2=75%.

For example, only the link Y1 and the link Y2 exist on the path 2, and the link utilization H22 of the link Y2 is higher than the link utilization H21 of the link Y1. This indicates that the link Y2 is a link with maximum link utilization on the path 2, and the link Y2 is a bottleneck link on the path 2.

In S102 and S103, because the ingress node A sends the measurement packet G1 and the measurement packet G2 to the egress node C on the path 1 and the path 2 at the same time, if a delay of the link X1 is the same as a delay of the link Y1, S102 and S103 are performed at the same time, and there is no sequence between S102 and S103.

S104: The egress node C respectively calculates a fair bandwidth D1 of the path 1 and a fair bandwidth D2 of the path 2 based on link information in the measurement packet G1 and the measurement packet G2.

For example, the fair bandwidth D1 of the path 1=(the receiving traffic R1 on the path 1/the sending traffic U12 on the link X2 of the path 1)×the link bandwidth B12 of the link X2 of the path 1=(300 MB/800 MB)×1000 MB=375 MB, and the fair bandwidth D2 of the path 2=(the receiving traffic R2 on the path 2/the sending traffic U22 on the link Y2 of the path 2)×the link bandwidth B22 of the link Y2 of the path 2=(900 MB/1500 MB)×2000 MB=1200 MB.

For example, the sending traffic U12 on the link X2 of the path 1 is 800 MB, the link bandwidth B12 of the link X2 of the path 1 is 1000 MB, and the receiving traffic R1 on the path 1 is 300 MB. This indicates that traffic on the link X2 occupied by the path 1 is 300 MB, and traffic on the link X2 occupied by another path is 500 MB. To allocate the bandwidth of the link X2 to the path 1, a ratio of the receiving traffic R1 on the path 1 to the sending traffic U12 on the link X2 of the path 1 needs to be calculated. The ratio is used to indicate a percentage of the receiving traffic on the path 1 in the sending traffic on the link X2, and the ratio=300 MB/800 MB=37.5%. After the egress node C learns that the percentage of the receiving traffic on the path 1 in the sending traffic on the link X2 is 37.5%, the egress node C may obtain the fair bandwidth D1 of the path 1 by calculating a product of the ratio and the link bandwidth B12 of the link X2. The fair bandwidth D1 of the path 1 is used to indicate a maximum bandwidth allocated to the path 1 by the link X2, to be specific, the maximum bandwidth allocated to the path 1 by the link X2 is 375 MB, and a sum of maximum bandwidths allocated to other paths by the link X2 is 625 MB.

Similarly, the fair bandwidth D2 of the path 2 is used to indicate a maximum bandwidth allocated to the path 2 by the link Y2, to be specific, the maximum bandwidth allocated to the path 2 by the link Y2 is 1200 MB, and a sum of maximum bandwidths allocated to other paths by the link Y2 is 800 MB.

S105: The egress node C calculates optimal utilization H of a path.

For example, the optimal utilization of the path H=sending traffic on all paths/fair bandwidths of all the paths=(the initial sending traffic S1 on the path 1+the initial sending traffic S2 on the path 2)/(the fair bandwidth D1 of the path 1+the fair bandwidth D2 of the path 2)=(300 MB+900 MB)/(375 MB+1200 MB)=76%.

The optimal utilization H of the path is a ratio of the sending traffic on all the paths to the fair bandwidths of all the paths, and the optimal utilization H of the path is used to indicate a ratio of sending traffic on the path to a fair bandwidth of the path.

S106: The egress node C separately calculates allocated traffic K1 on the path 1 and allocated traffic K2 on the path 2.

For example, the allocated traffic K1 on the path 1=the optimal utilization H of the path×the fair bandwidth D1 of the path 1=76%×375 MB=285 MB. The allocated traffic K2 on the path 2=the optimal utilization H of the path×the fair bandwidth D2 of the path 2=76%×1200 MB=912 MB.

The allocated traffic K1 on the path 1 is used to indicate sending traffic on a link of the path 1, and the allocated traffic K2 on the path 2 is used to indicate sending traffic on a link of the path 2.

S107: The egress node C separately calculates a traffic adjustment amount L1 of the path 1 and a traffic adjustment amount L2 of the path 2.

For example, the traffic adjustment amount L1 of the path 1=the allocated traffic K1 on the path 1−the initial sending traffic S1 on the path 1=285 MB−300 MB=−15 MB. The traffic adjustment amount L2 of the path 2=the allocated traffic K2 on the path 2−the initial sending traffic S2 on the path 2=912 MB−900 MB=12 MB.

For example, the traffic adjustment amount L1 of the path 1 is used to indicate traffic that needs to be adjusted on the path 1, and the traffic adjustment amount L2 of the path 2 is used to indicate traffic that needs to be adjusted on the path 2.

S108: The egress node C sends a response packet Y to the ingress node A.

For example, the response packet Y includes the traffic adjustment amount L1 of the path 1 and the traffic adjustment amount L2 of the path 2.

In addition, the response packet may further include at least one of the path identifier of the path 1, the path identifier of the path 2, the timestamp t1, the timestamp t2, a timestamp t3, a timestamp t4, a timestamp t5, the receiving traffic R1 on the path 1, the receiving traffic R2 on the path 2, the link utilization H12 (80%) of the link X2, the link utilization H22 (75%) of the link Y2, and the sending traffic U12 (800 MB) of the link X2, the bandwidth B12 (1000 MB) of the link X2, the sending traffic U22 (1500 MB) of the link Y2, or the bandwidth B22 (2000 MB) of the link Y2. The timestamp t3 is a receiving time of the measurement packet G1, the timestamp t4 is a receiving time of the measurement packet G2, the timestamp t5 is a sending time of the response packet Y, the receiving traffic R1 on the path 1 is accumulated receiving traffic on the path 1 in a third time period (3 to 6 ms), and the receiving traffic R2 on the path 2 is accumulated receiving traffic on the path 2 in the third time period (3 to 6 ms).

The receiving traffic R1 on the path 1 may alternatively be accumulated receiving traffic on the path 1 corresponding to the timestamp t3. If the measurement packet G1 includes the timestamp t3, the receiving traffic R1 on the path 1 is accumulated sending traffic on the path 1 at the timestamp t3. The ingress node may calculate the accumulated receiving traffic on the path 1 in the third time period (3 to 6 ms) based on receiving traffic on the path 1 at the $3^{rd}$ ms and receiving traffic on the path 1 at a $6^{th}$ ms in two adjacent received response packets.

S109: The ingress node A receives the response packet Y sent by the egress node C, and determines to-be-sent traffic Z1 on the path 1 and to-be-sent traffic Z2 on the path 2 based on the response packet Y.

For example, the to-be-sent traffic Z1 of the path 1=the traffic adjustment amount L1 of the path 1+the initial sending traffic S1 on the path 1=−15 MB+300 MB=285 MB, and the to-be-sent traffic Z2 on the path 2=the traffic adjustment amount L2 of the path 2+the initial sending traffic S2 on the path 2=12 MB+900 MB=912 MB.

In S109, because the traffic adjustment amount L1 of the path 1 is −15 MB, it indicates that traffic actually sent on the path 1 is large, and traffic of 15 MB may be reduced.

Because the traffic adjustment amount L2 of the path 2 is 12 MB, it indicates that traffic actually sent on the path 2 is small, and traffic of 12 MB may be added.

For example, the to-be-sent traffic Z1 on the path 1 is expected accumulated to-be-sent traffic on the ingress node A on the path 1 in a fourth time period, and the to-be-sent traffic Z2 on the path 2 is expected accumulated to-be-sent traffic on the ingress node A on the path 2 in the fourth time period.

The fourth time period is later than the third time period. For example, it is assumed that the first time period is 0 to 10 μs, the second time period is 0 to 3 ms, the third time period is 3 ms to 6 ms, and the fourth time period is 6 ms to 9 ms.

In the embodiment shown in FIG. 2 and FIG. 3, the ingress node A, the intermediate node B1, the intermediate node B2, and the egress node C collaborate with each other, so that the ingress node A can learn of a load status of the bottleneck link in the network, and the ingress node A can allocate to-be-sending traffic to the path 1 and the path 2. This ensures that load of links in the network is more balanced.

In the embodiment shown in FIG. 2 and FIG. 3, in S104 to S109, the egress node C calculates the fair bandwidth D1 of the path 1, the fair bandwidth D2 of the path 2, the optimal utilization H of the path, the allocated traffic K1 on the path 1, the allocated traffic K2 on the path 2, the traffic adjustment amount L1 of the path 1, and the traffic adjustment amount L2 of the path 2. Then, the egress node C puts the traffic adjustment amount L1 of the path 1 and the traffic adjustment amount L2 of the path 2 into the response packet Y, and sends the response packet Y to the ingress node A.

S104 to S109 provide an implementation in this embodiment of this application. This embodiment of this application may alternatively use another implementation. The following briefly describes several specific implementations.

In a first manner, after the egress node C receives the measurement packet G1 and the measurement packet G2 sent by the intermediate node B1 and the intermediate node B2, the egress node C puts the receiving traffic R1 on the path 1, the sending traffic U12 on the link X2 of the path 1, the link bandwidth B12 of the link X2 of the path 1, the receiving traffic R2 on the path 2, the sending traffic U22 on the link Y2 of the path 2, and the link bandwidth B22 of the link Y2 of the path 2 into the response packet Y, and sends the response packet Y to the ingress node A. After the ingress node A receives the response packet Y, the ingress node A calculates the to-be-sent traffic Z1 on the path 1 and the to-be-sent traffic Z2 on the path 2 based on information in the response packet Y.

In a second manner, after the egress node C receives the measurement packet G1 and the measurement packet G2 sent by the intermediate node B1 and the intermediate node B2, the egress node C calculates the fair bandwidth D1 of path 1 and the fair bandwidth D2 of path 2 based on the link information in the measurement packet G1 and the measurement packet G2, and the egress node C puts the fair bandwidth D1 of path 1 and the fair bandwidth D2 of path 2 into the response packet Y, and sends the response packet Y to the ingress node A. After the ingress node A receives the response packet Y, the ingress node A calculates the to-be-sent traffic Z1 on the path 1 and the to-be-sent traffic Z2 on the path 2 based on information in the response packet Y.

In a third manner, after the egress node C receives the measurement packet G1 and the measurement packet G2 sent by the intermediate node B1 and the intermediate node B2, the egress node C calculates the fair bandwidth D1 of the path 1 and the fair bandwidth D2 of the path 2 based on the link information in the measurement packet G1 and the measurement packet G2, the egress node C calculates the optimal utilization H of the path, and the egress node C puts the fair bandwidth D1 of path 1, the fair bandwidth D2 of path 2, and the optimal utilization H of the path into the response packet Y, and sends the response packet Y to the ingress node A. After the ingress node A receives the response packet Y, the ingress node A calculates the to-be-sent traffic Z1 on the path 1 and the to-be-sent traffic Z2 on the path 2 based on information in the response packet Y.

In a fourth manner, after the egress node C receives the measurement packet G1 and the measurement packet G2 sent by the intermediate node B1 and the intermediate node B2, the egress node C calculates the fair bandwidth D1 of the path 1 and the fair bandwidth D2 of the path 2 based on the link information in the measurement packet G1 and the measurement packet G2, the egress node C calculates the optimal utilization H of the path, the egress node C calculates the allocated traffic K1 on the path 1 and the allocated traffic K2 on the path 2, and the egress node C puts the allocated traffic K1 on the path 1 and the allocated traffic K2 on the path 2 into the response packet Y, and sends the response packet Y to the ingress node A. After the ingress node A receives the response packet Y, the ingress node A calculates the to-be-sent traffic Z1 on the path 1 and the to-be-sent traffic Z2 on the path 2 based on information in the response packet Y.

In the embodiment shown in FIG. 2 and FIG. 3, the measurement packet includes the sending traffic on the link, the bandwidth of the link, and initial sending traffic on the path. The measurement packet may also include the link utilization of the link and the initial sending traffic on the path. If the measurement packet includes the link utilization of the link and the initial sending traffic on the path, a fair bandwidth D of the path=receiving traffic R of the path/the link utilization of the link. A calculation result in this manner is the same as a calculation result in S104, and a calculation manner of other parameters remains unchanged. For example, the fair bandwidth D1 of the path 1=the receiving traffic R1 on the path 1/the link utilization H12 of the link X2=300 MB/80%=375 MB.

Figure 4:
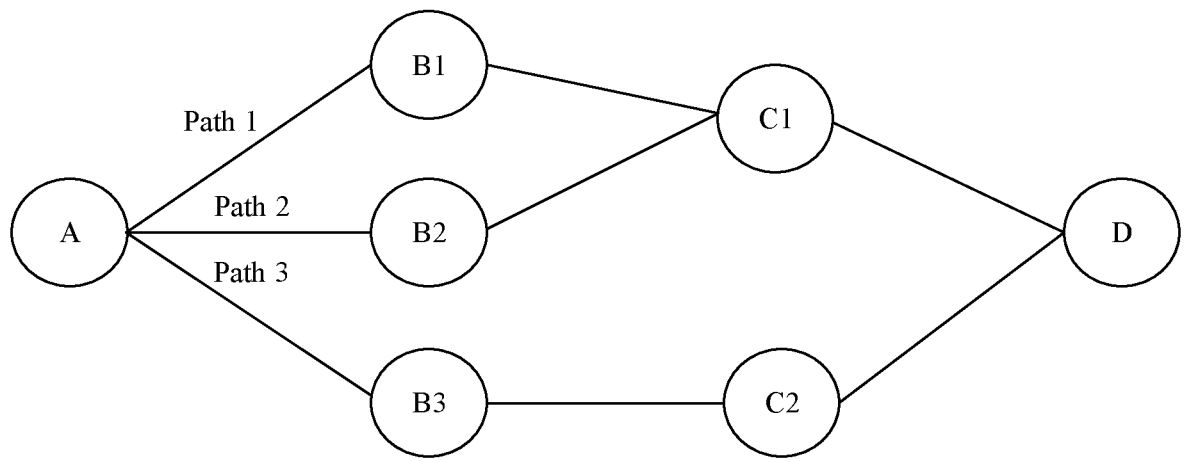
FIG. 4 is a schematic diagram of still another network according to an embodiment of this application.

FIG. 4 is a schematic diagram of still another network according to an embodiment of this application. The network shown in FIG. 4 includes an ingress node A, an intermediate node B1, an intermediate node B2, an intermediate node B3, an intermediate node C1, an intermediate node C2, and an egress node D. There are three paths a path 1, a path 2, and a path 3 between the ingress node A and the egress node D. For example, the path 1 is the node A->the node B1->the node C1->the node D, the path 2 is the node A->the node B2->the node C1->the node D, and the path 3 is the node A->the node B3->the node C2->the node D.

In the embodiment shown in FIG. 4, it is assumed that a bottleneck link of the path 1 is a link C1-D, a bottleneck link of the path 2 is the link C1-D, a bottleneck link of the path 3 is a link C2-D, a bandwidth B1 of the link C1-D=a bandwidth B2 of the link C2-D=2000 MB, sending traffic U1 on the link C1-D=2000 MB, sending traffic U2 on the link C2-D=1000 MB, and sending traffic S1 on the path 1=sending traffic S2 on the path 2=sending traffic S3 on the path 3=receiving traffic R1 on the path 1=receiving traffic R2 on the path 2=receiving traffic R3 on the path 3=1000 MB.

In the embodiment shown in FIG. 4, the ingress node A sends a measurement packet G1, a measurement packet G2, and a measurement packet G3 to the egress node D on the path 1, the path 2, and the path 3 respectively. For execution processes of the intermediate node B1, the intermediate node B2, the intermediate node B3, the intermediate node C1 and the intermediate node C2, refer to S102 and S103 in the embodiment shown in FIG. 3, and details are not described herein again.

In the embodiment shown in FIG. 4, after the egress node D receives the measurement packet G1, the measurement packet G2, and the measurement packet G3, the egress node D calculates a fair bandwidth D1 of the path 1, a fair bandwidth D2 of the path 2, and a fair bandwidth D3 of the path 3.

For example, the fair bandwidth D1 of the path 1=(the receiving traffic R1 on the path 1/the sending traffic U1 on the link C1-D of the path 1)×a link bandwidth B1 of the link C1-D of the path 1=(1000 MB/2000 MB)×2000 MB=1000 MB.

For example, the fair bandwidth D2 of the path 2=(the receiving traffic R2 on the path 2/the sending traffic U1 on the link C1-D of the path 2)×the link bandwidth B1 of the link C1-D of the path 2=(1000 MB/2000 MB)×2000 MB=1000 MB.

For example, the fair bandwidth D3 of the path 3=(the receiving traffic R3 on the path 3/the sending traffic U2 on the link C2-D of the path 3)×a link bandwidth B2 of the link C2-D of the path 3=(1000 MB/1000 MB)×2000 MB=2000 MB.

In the embodiment shown in FIG. 4, after the egress node D calculates the fair bandwidth D1 of path 1, the fair bandwidth D2 of path 2, and the fair bandwidth D3 of path 3, the egress node D calculates optimal utilization H of a path.

For example, the optimal utilization of the path H=sending traffic on all paths/fair bandwidths of all paths=(the initial sending traffic S1 on the path 1+the initial sending traffic S2 on the path 2+the initial sending traffic S3 on the path 3)/(the fair bandwidth D1 of the path 1+the fair bandwidth D2 of the path 2+the fair bandwidth D3 of the path 3)=(1000 MB+1000 MB+1000 MB)/(1000 MB+1000 MB+2000 MB)=75%.

In the embodiment shown in FIG. 4, after the egress node D calculates the optimal utilization H of the path, the egress node C calculates allocated traffic K1 on the path 1, allocated traffic K2 on the path 2, and allocated traffic K3 on the path 3 respectively.

For example, the allocated traffic K1 on the path 1=the optimal utilization H of the path×the fair bandwidth D1 of the path 1=75%×1000 MB=750 MB.

For example, the allocated traffic K2 on the path 2=the optimal utilization H of the path×the fair bandwidth D2 of the path 2=75%×1000 MB=750 MB.

For example, the allocated traffic K3 on the path 3=the optimal utilization H of the path×the fair bandwidth D3 of the path 3=75%×2000 MB=1500 MB.

In the embodiment shown in FIG. 4, after the egress node C separately calculates the allocated traffic K1 on the path 1, the allocated traffic K2 on the path 2, and the allocated traffic K3 on the path 3, the egress node C separately calculates a traffic adjustment amount L1 of the path 1, a traffic adjustment amount L2 of the path 2, and a traffic adjustment amount L3 of the path 3.

For example, the traffic adjustment amount L1 of the path 1=the allocated traffic K1 on the path 1−the initial sending traffic S1 on the path 1=750 MB−1000 MB=−250 MB.

For example, the traffic adjustment amount L2 of the path 2=the allocated traffic K2 on the path 2−the initial sending traffic S2 on the path 2=750 MB−1000 MB=−250 MB.

For example, the traffic adjustment amount L3 of the path 3=the allocated traffic K3 on the path 3−the initial sending traffic S3 on the path 3=1500 MB−1000 MB=500 MB.

In the embodiment shown in FIG. 4, after the egress node C separately calculates the traffic adjustment amount L1 of the path 1, the traffic adjustment amount L2 of the path 2, and the traffic adjustment amount L3 of the path 3, the egress node C sends a response packet Y to the ingress node A.

For example, the response packet Y includes the traffic adjustment amount L1 of the path 1, the traffic adjustment amount L2 of the path 2, and the traffic adjustment amount L3 of the path 3.

In the embodiment shown in FIG. 4, the ingress node receives the response packet Y sent by the egress node C, and determines to-be-sent traffic Z1 on the path 1, to-be-sent traffic Z2 on the path 2, and to-be-sent traffic Z3 on the path 3 based on the response packet Y.

For example, the to-be-sent traffic Z1 on the path 1=the traffic adjustment amount L1 of the path 1+the initial sending traffic S1 on the path 1=−250 MB+1000 MB=750 MB.

For example, the to-be-sent traffic Z2 on the path 2=the traffic adjustment amount L2 of the path 2+the initial sending traffic S2 on the path 2=−250 MB+1000 MB=750 MB.

For example, the to-be-sent traffic Z3 on the path 3=the traffic adjustment amount L3 of the path 3+the initial sending traffic S3 on the path 3=500 MB+1000 MB=1500 MB.

In the embodiment shown in FIG. 4, the sending traffic U1 on the link C1-D is accumulated sending traffic on the link C1-D in a first time period, and the sending traffic U2 on the link C2-D is accumulated sending traffic on the link C2-D in the first time period. The sending traffic S1 on the path 1 is accumulated sending traffic of the egress node A on the path 1 in a second time period, the sending traffic S2 on the path 2 is accumulated sending traffic of the egress node A on the path 2 in the second time period, and the sending traffic S3 on the path 3 is accumulated sending traffic of the egress node A on the path 3 in the second time period. The receiving traffic R1 on the path 1 is accumulated receiving traffic of the egress node D on the path 1 in a third time period, the receiving traffic R2 on the path 2 is accumulated receiving traffic of the egress node D on the path 2 in the third time period, and the receiving traffic R3 of path 3 is accumulated receiving traffic of the egress node D on the path 3 in the third time period.

In the embodiment shown in FIG. 4, the to-be-sent traffic Z1 on the path 1 is expected accumulated sending traffic of the ingress node A on the path 1 in a fourth time period, the to-be-sent traffic Z2 of the path 2 is expected accumulated sending traffic of the ingress node A on the path 2 in the fourth time period, and the to-be-sent traffic Z3 in the path 3 is expected accumulated sending traffic of the ingress node A on the path 3 in the fourth time period.

In the embodiment shown in FIG. 4, it is assumed that the first time period is 0 to 10 µs, the second time period is 0 to 3 ms, the third time period is 3 ms to 6 ms, and the fourth time period is 6 ms to 9 ms. In the first time period, link utilization H1 of the link C1-D=the sending traffic U1 on the link C1-D/the bandwidth B1 of the link C1-D=2000 MB/2000 MB=100%, and link utilization H2 of the link C2-D=the sending traffic U2 on the link C2-D/the bandwidth B2 of the link C2-D=1000 MB/2000 MB=50%. The link C1-D is overloaded, and the link C2-D is underloaded. In the fourth time period, the link utilization H1 of the link C1-D=the sending traffic U1 on the link C1-D/the bandwidth B1 of the link C1-D=1500 MB/2000 MB=75%, and the link utilization H2 of the link C2-D=the sending traffic U2 on the link C2-D/the bandwidth B2 of the link C2-D=1500 MB/2000 MB=75%. The link utilization of the link C1-D and that of the link C2-D are very balanced. It can be learned from the embodiment shown in FIG. 4 that, the solution provided in this embodiment of this application can ensure that load of links in the network is more balanced.

Figure 5:
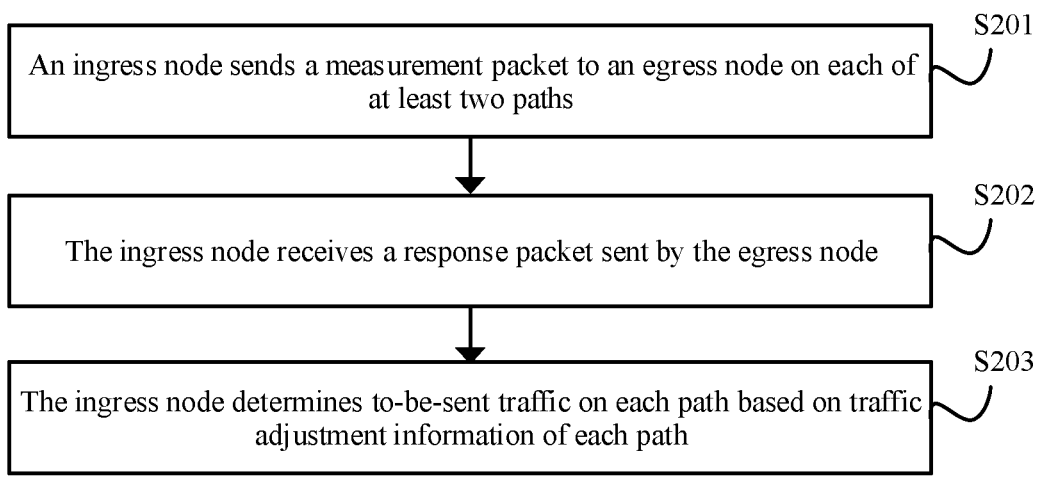
FIG. 5 is a flowchart of another path traffic allocation method according to an embodiment of this application.

FIG. 5 is a flowchart of another path traffic allocation method according to an embodiment of this application. The path traffic allocation method shown in FIG. 5 may be applied to an ingress node. The method shown in FIG. 5 includes the following steps.

S201: The ingress node sends a measurement packet to an egress node on each of at least two paths.

The at least two paths are paths between the ingress node and the egress node, and the measurement packet on each path is used to indicate path information of each path.

For example, the measurement packet includes sending traffic on a link and a bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

For another example, the measurement packet includes link utilization of the link, and the link utilization is a ratio of the sending traffic on the link to the bandwidth of the link. In addition, the measurement packet further includes at least one of the initial sending traffic on the path, the path identifier, or the first timestamp.

For specific implementation of S201, refer to the description of S101 in the embodiment shown in FIG. 3.

S202: The ingress node receives a response packet sent by the egress node.

The response packet is used to indicate traffic adjustment information of each path.

S203: The ingress node determines to-be-sent traffic on each path based on the traffic adjustment information of each path.

For specific implementation of S202 and S203, refer to the description of S109 in the embodiment shown in FIG. 3.

In the embodiment shown in FIG. 5, in a network, the ingress node may collaborate with an intermediate node and the egress node, so that the ingress node learns of a load status of a link in the network, and the ingress node can allocate sending traffic to each path. This ensures that load of links in the network is more balanced.

In the embodiment shown in FIG. 5, the response packet includes a traffic adjustment amount of each path, and the traffic adjustment amount of each path is used to indicate traffic that needs to be adjusted on each path. S203 shown in FIG. 5 may further include: The ingress node obtains the initial sending traffic on each path, and the ingress node determines the to-be-sent traffic on each path based on the traffic adjustment amount of each path and the initial sending traffic on each path.

In the embodiment shown in FIG. 5, the response packet includes allocated traffic on each path, and the allocated traffic on each path is used to indicate sending traffic on a link of each path. S203 shown in FIG. 5 may further include: The ingress node obtains the initial sending traffic on each path; the ingress node obtains the traffic adjustment amount of each path based on the initial sending traffic on each path and the allocated traffic on each path; and the ingress node determines the to-be-sent traffic on each path based on the traffic adjustment amount of each path and the initial sending traffic on each path.

In the embodiment shown in FIG. 5, the response packet includes optimal utilization of each path and a fair bandwidth of each path. The fair bandwidth of each path is used to indicate a bandwidth allocated to each path, and the optimal utilization of each path is used to indicate a ratio of the sending traffic on each path to the fair bandwidth of each path. S203 shown in FIG. 5 may further include: The ingress node determines the allocated traffic on each path based on the optimal utilization of each path and the fair bandwidth of each path; the ingress node obtains the initial sending traffic on each path; the ingress node determines the traffic adjustment amount of each path based on the initial sending traffic on each path and the allocated traffic on each path; and the ingress node determines the to-be-sent traffic on each path based on the traffic adjustment amount of each path and the initial sending traffic on each path.

In the embodiment shown in FIG. 5, the response packet includes the fair bandwidth of each path. S203 shown in FIG. 5 may further include: The ingress node obtains the initial sending traffic on each path; the ingress node determines the optimal utilization of each path based on the initial sending traffic on each path and the fair bandwidth of each path; the ingress node determines the allocated traffic on each path based on the optimal utilization of each path and the fair bandwidth of each path; the ingress node determines the traffic adjustment amount of each path based on the initial sending traffic on each path and the allocated traffic on each path; and the ingress node determines the to-be-sent traffic on each path based on the traffic adjustment amount of each path and the initial sending traffic on each path.

In the embodiment shown in FIG. 5, the response packet includes receiving traffic on each path and information about the link of each path. The link is a link with maximum link utilization on the path, and the link utilization is the ratio of the sending traffic on the link to the bandwidth of the link. S203 shown in FIG. 5 may further include: The ingress node determines the fair bandwidth of each path based on the receiving traffic on each path and the information about the link of each path; the ingress node obtains the initial sending traffic on each path; the ingress node determines the optimal utilization of each path based on the initial sending traffic on each path and the fair bandwidth of each path; the ingress node determines the allocated traffic on each path based on the optimal utilization of each path and the fair bandwidth of each path; the ingress node determines the traffic adjustment amount of each path based on the initial sending traffic on each path and the allocated traffic on each path; and the ingress node determines the to-be-sent traffic on each path based on the traffic adjustment amount of each path and the initial sending traffic on each path.

In the embodiment shown in FIG. 5, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

In the embodiment shown in FIG. 5, that the ingress node determines to-be-sent traffic on a first path based on a traffic adjustment amount of the first path and initial sending traffic on the first path may include: The ingress node calculates a sum of the traffic adjustment amount of the first path and the initial sending traffic on the first path to obtain the to-be-sent traffic on the first path. The first path is any path of the at least two paths.

In the embodiment shown in FIG. 5, that the ingress node determines the traffic adjustment amount of the first path based on the initial sending traffic on the first path and allocated traffic on the first path may include: The ingress node calculates a difference between the allocated traffic on the first path and the initial sending traffic on the first path to obtain the traffic adjustment amount of the first path.

In the embodiment shown in FIG. 5, that the ingress node determines the allocated traffic on the first path based on optimal utilization of each path and a fair bandwidth of the first path may include: The ingress node calculates a product of the optimal utilization of each path and the fair bandwidth of the first path to obtain the allocated traffic on the first path.

In the embodiment shown in FIG. 5, that the ingress node determines the optimal utilization of each path based on the initial sending traffic on each path and the fair bandwidth of each path may include: The ingress node calculates a sum of initial sending traffic on all paths to obtain total sending traffic; the ingress node calculates a sum of fair bandwidths of all the paths to obtain a total fair bandwidth; and the ingress node calculates a quotient of the total sending traffic and the total fair bandwidth to obtain the optimal utilization of each path.

In the embodiment shown in FIG. 5, that the ingress node determines the fair bandwidth of the first path based on receiving traffic on the first path and information about a link of the first path may include: The ingress node calculates a quotient of the receiving traffic on the first path and sending traffic on the link of the first path to obtain a first ratio; and the ingress node calculates a product of the first ratio and a bandwidth of the first path to obtain the fair bandwidth of the first path.

In the embodiment shown in FIG. 5, that the ingress node determines the fair bandwidth of the first path based on the receiving traffic on the first path and the information about the link of the first path may further include: The ingress node calculates a quotient of the receiving traffic on the first path and link utilization of the link of the first path to obtain the fair bandwidth of the first path.

Figure 6:
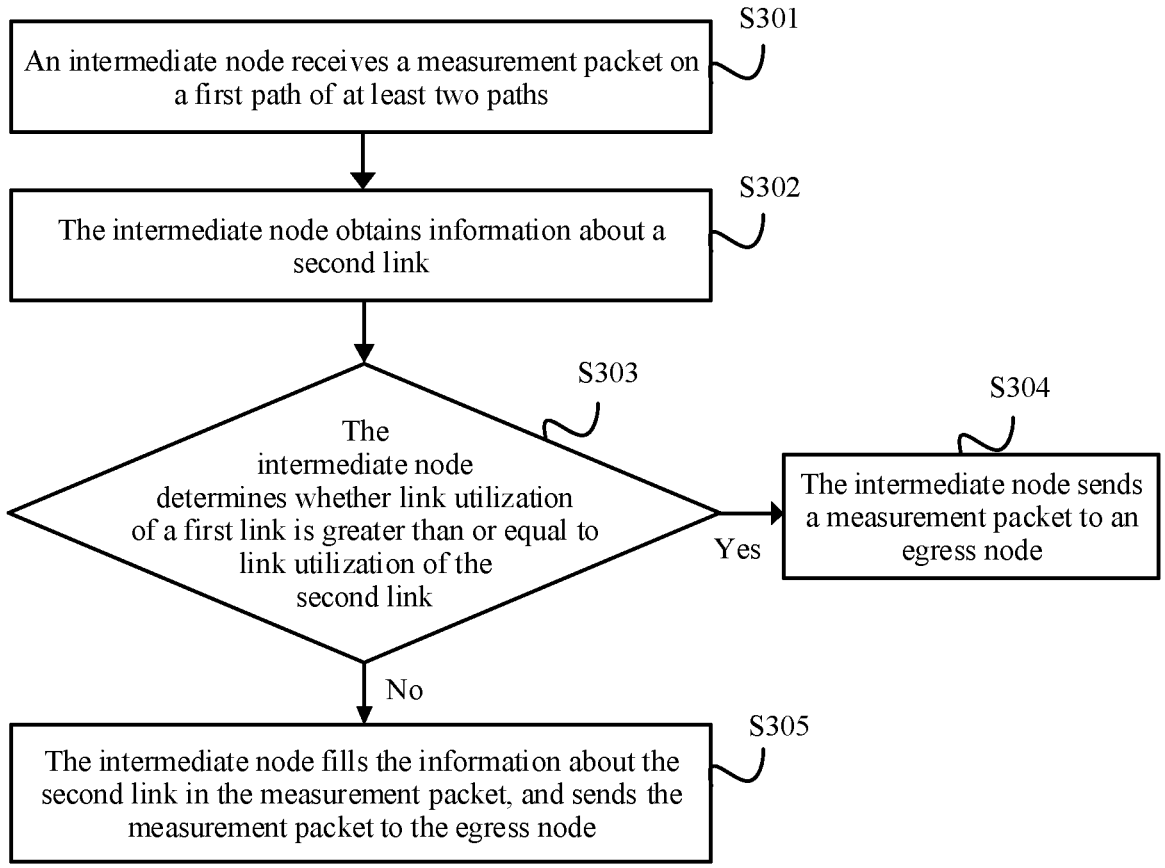
FIG. 6 is a flowchart of still another path traffic allocation method according to an embodiment of this application.

FIG. 6 is a flowchart of still another path traffic allocation method according to an embodiment of this application. The path traffic allocation method shown in FIG. 6 may be applied to an intermediate node. The method shown in FIG. 6 includes the following steps.

S301: The intermediate node receives a measurement packet on a first path of at least two paths.

The at least two paths are paths between an ingress node and an egress node, and the measurement packet is used to indicate information about a first link of the first path.

For example, the measurement packet includes sending traffic on a link and a bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

For another example, the measurement packet includes link utilization of the link, and the link utilization is a ratio of the sending traffic on the link to the bandwidth of the link. In addition, the measurement packet further includes at least one of the initial sending traffic on the path, the path identifier, or the first timestamp.

S302: The intermediate node obtains information about a second link.

The second link is a link connected to an egress port of the intermediate node on the first path.

S303: The intermediate node determines, based on information about the first link and information about the second link, whether link utilization of the first link is greater than or equal to link utilization of the second link. If the link utilization of the first link is greater than or equal to the link utilization of the second link, perform S304; and if the link utilization of the first link is not greater than or equal to the link utilization of the second link, perform S305.

S304: When the intermediate node determines, based on the information about the first link and the information about the second link, that the link utilization of the first link is greater than or equal to the link utilization of the second link, the intermediate node sends the measurement packet to the egress node, where the link utilization is used to indicate traffic usage of the link.

S305: When the intermediate node determines, based on the information about the first link and the information about the second link, that the link utilization of the first link is less than the link utilization of the second link, the intermediate node fills the information about the second link in the measurement packet, and the intermediate node sends the measurement packet to the egress node.

For specific implementation of S301 and S305, refer to the description of S102 and S103 in the embodiment shown in FIG. 3.

In the embodiment shown in FIG. 6, in a network, the intermediate node may collaborate with the ingress node and the egress node, so that the ingress node learns of a load status of a link in the network, and the ingress node can allocate sending traffic to each path. This ensures that load of links in the network is more balanced.

In the embodiment shown in FIG. 6, the information about the first link may include sending traffic on the first link and a bandwidth of the first link, and the information about the second link includes sending traffic on the second link and a bandwidth of the second link. The information about the first link may also include the link utilization of the first link, and the information about the second link includes the link utilization of the second link.

In the embodiment shown in FIG. 6, after S305, the path traffic allocation method provided in this embodiment of this application may further include: A first intermediate node deletes a first measurement packet.

In the embodiment shown in FIG. 6, the first measurement packet may further include at least one of a path identifier of the first path, a timestamp, or initial sending traffic on the first path, and the timestamp is a sending time of the first measurement packet. A second measurement packet may further include at least one of a path identifier of the first path, the timestamp of the first path, or the initial sending traffic on the first path.

Figure 7:
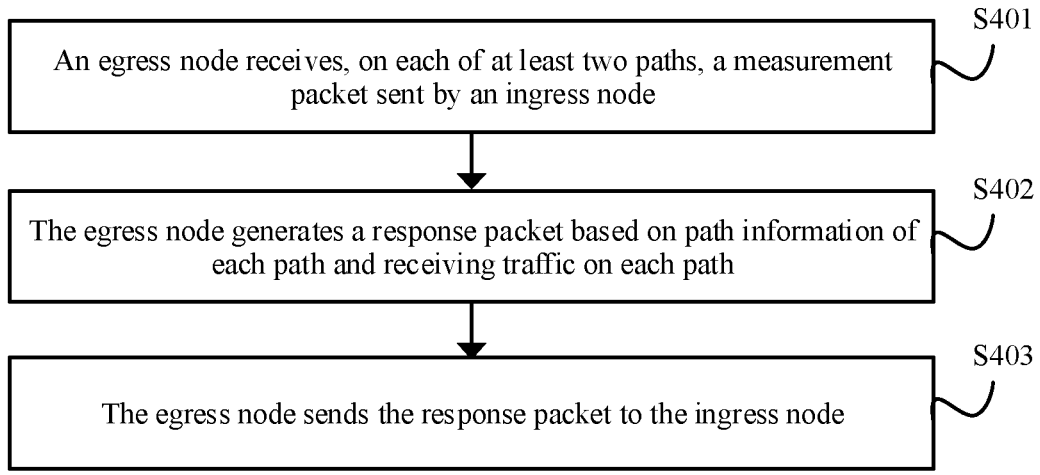
FIG. 7 is a flowchart of yet another path traffic allocation method according to an embodiment of this application.

FIG. 7 is a flowchart of yet another path traffic allocation method according to an embodiment of this application. The path traffic allocation method shown in FIG. 7 may be applied to an egress node. The method shown in FIG. 7 includes the following steps:

S401: The egress node receives, on each of at least two paths, a measurement packet sent by an ingress node.

The at least two paths are paths between an ingress node and the egress node, and the measurement packet on each path is used to indicate path information of each path.

For example, the measurement packet includes sending traffic on a link and a bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

For another example, the measurement packet includes link utilization of the link, and the link utilization is a ratio of the sending traffic on the link to the bandwidth of the link. In addition, the measurement packet further includes at least one of the initial sending traffic on the path, the path identifier, or the first timestamp.

S402: The egress node generates a response packet based on the path information of each path and receiving traffic on each path.

The response packet is used to indicate traffic adjustment information of each path.

S403: The egress node sends the response packet to the ingress node.

The response packet includes at least one piece of quality information. For example, the response packet may include a fair bandwidth of each path, and the fair bandwidth of each path is quality information of each path. For another example, the response packet may include optimal utilization of each path and the fair bandwidth of each path, and the optimal utilization of each path and the fair bandwidth of each path are the quality information of each path. For still another example, the response packet may include allocated traffic on each path, and the allocated traffic on each path is the quality information of each path. For yet another example, the response packet may include a traffic adjustment amount of each path, and the traffic adjustment amount of each path is the quality information of each path.

For specific implementation of S401 and S403, refer to the description of S104 to S108 in the embodiment shown in FIG. 3.

In the embodiment shown in FIG. 7, in a network, the egress node may collaborate with the ingress node and an intermediate node, so that the ingress node learns of a load status of a link in the network, and the ingress node can allocate sending traffic to each path. This ensures that load of links in the network is more balanced.

In the embodiment shown in FIG. 7, S402 in FIG. 7 may include: The egress node determines the fair bandwidth of each path based on information about a link of each path and the receiving traffic on each path; and the egress node generates the response packet. The response packet includes the fair bandwidth of each path.

In the embodiment shown in FIG. 7, S402 in FIG. 7 may include: The egress node determines the fair bandwidth of each path based on the information about the link of each path and the receiving traffic on each path; the egress node obtains initial sending traffic on each path; the egress node determines optimal utilization of each path based on the initial sending traffic on each path and the fair bandwidth of each path; and the egress node generates the response packet. The response packet includes the optimal utilization of each path and the fair bandwidth of each path.

In the embodiment shown in FIG. 7, S402 in FIG. 7 may include: The egress node determines the fair bandwidth of each path based on the information about the link of each path and the receiving traffic on each path; the egress node obtains the initial sending traffic on each path; the egress node determines the optimal utilization of each path based on the initial sending traffic on each path and the fair bandwidth of each path; the ingress node determines the allocated traffic on each path based on the optimal utilization of each path and the fair bandwidth of each path; and the egress node generates the response packet. The response packet includes the allocated traffic on each path.

In the embodiment shown in FIG. 7, S402 in FIG. 7 may include: The egress node determines the fair bandwidth of each path based on the information about the link of each path and the receiving traffic on each path; the egress node obtains the initial sending traffic on each path; the egress node determines the optimal utilization of each path based on the initial sending traffic on each path and the fair bandwidth of each path; the ingress node determines the allocated traffic on each path based on the optimal utilization of each path and the fair bandwidth of each path; the ingress node determines the traffic adjustment amount of each path based on the initial sending traffic on each path and the allocated traffic on each path; and the egress node generates the response packet. The response packet includes the traffic adjustment amount of each path.

In the embodiment shown in FIG. 7, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

In the embodiment shown in FIG. 7, that the egress node determines a fair bandwidth of a first path based on information about a link of the first path and receiving traffic on the first path may include: The egress node determines the fair bandwidth of the first path based on the information about the link of the first path and the receiving traffic on the first path by calculation. The first path is any path of the at least two paths.

In the embodiment shown in FIG. 7, that the egress node determines the optimal utilization of each path based on the initial sending traffic on each path and the fair bandwidth of each path may include: The egress node calculates a sum of initial sending traffic on all paths to obtain total sending traffic; the egress node calculates a sum of fair bandwidths of all the paths to obtain a total fair bandwidth; and the egress node calculates a quotient of the total sending traffic and the total fair bandwidth to obtain the optimal utilization of each path.

In the embodiment shown in FIG. 7, that the egress node determines the allocated traffic on each path based on the optimal utilization of each path and the fair bandwidth of the first path may include: The egress node calculates a product of the optimal utilization of each path and the fair bandwidth of the first path to obtain allocated traffic on the first path. The first path is any path of the at least two paths.

In the embodiment shown in FIG. 7, that the egress node determines a traffic adjustment amount of the first path based on initial sending traffic on the first path and the allocated traffic on the first path may include: The egress node calculates a difference between the allocated traffic on the first path and the initial sending traffic on the first path to obtain the traffic adjustment amount of the first path. The first path is any path of the at least two paths.

Figure 8:
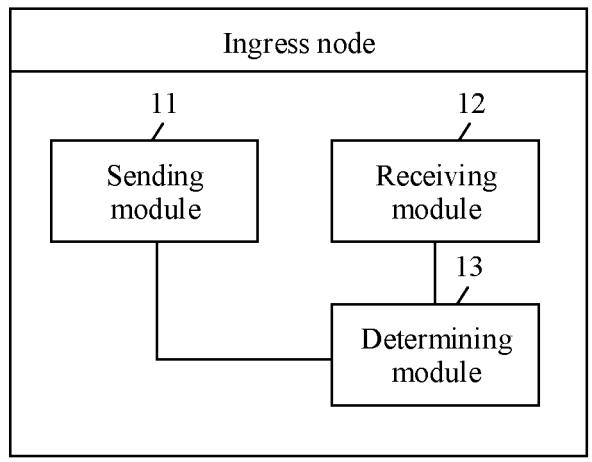
FIG. 8 is a schematic diagram of an ingress node according to an embodiment of this application.

FIG. 8 is a schematic diagram of an ingress node according to an embodiment of this application. The ingress node shown in FIG. 8 includes the following modules.

A sending module 11 is configured to send a measurement packet to an egress node on each of at least two paths.

The at least two paths are paths between the ingress node and the egress node, and the measurement packet on each path is used to indicate path information of each path.

A receiving module 12 receives a response packet sent by the egress node.

The response packet is used to indicate traffic adjustment information of each path.

A determining module 13 is configured to determine to-be-sent traffic on each path based on the traffic adjustment information of each path.

For specific and detailed implementations of the sending module 11, the receiving module 12, and the determining module 13, refer to the detailed description of S101 and S109 in the method embodiment shown in FIG. 3.

In a possible implementation, the response packet includes a traffic adjustment amount of each path, and the traffic adjustment amount of each path is used to indicate traffic that needs to be adjusted on each path. The determining module 13 is specifically configured to obtain initial sending traffic on each path, and determine the to-be-sent traffic on each path based on the traffic adjustment amount of each path and the initial sending traffic on each path.

In a possible implementation, the response packet includes allocated traffic on each path, and the allocated traffic on each path is used to indicate sending traffic on a link of each path. The determining module 13 is specifically configured to: obtain the initial sending traffic on each path; determine the traffic adjustment amount of each path based on the initial sending traffic on each path and the allocated traffic on each path; and determine the to-be-sent traffic on each path based on the traffic adjustment amount of each path and the initial sending traffic on each path.

In a possible implementation, the response packet includes optimal utilization of each path and a fair bandwidth of each path. The fair bandwidth of each path is used to indicate a bandwidth allocated to each path, and the optimal utilization of each path is used to indicate a ratio of sending traffic on each path to the fair bandwidth of each path. The determining module 13 is specifically configured to: determine the allocated traffic on each path based on the optimal utilization of each path and the fair bandwidth of each path; obtain the initial sending traffic on each path; determine the traffic adjustment amount of each path based on the initial sending traffic on each path and the allocated traffic on each path; and determine the to-be-sent traffic on each path based on the traffic adjustment amount of each path and the initial sending traffic on each path.

In a possible implementation, the response packet includes the fair bandwidth of each path. The determining module 13 is specifically configured to: obtain the initial sending traffic on each path; determine the optimal utilization of each path based on the initial sending traffic on each path and the fair bandwidth of each path; determine the allocated traffic on each path based on the optimal utilization of each path and the fair bandwidth of each path; determine the traffic adjustment amount of each path based on the initial sending traffic on each path and the allocated traffic on each path; and determine the to-be-sent traffic on each path based on the traffic adjustment amount of each path and the initial sending traffic on each path.

In a possible implementation, the response packet includes receiving traffic on each path and information about the link of each path. The link is a link with maximum link utilization on the path, and the link utilization is a ratio of the sending traffic on the link to a bandwidth of the link. The determining module 13 is specifically configured to: determine the fair bandwidth of each path based on the receiving traffic on each path and the information about the link of each path; obtain the initial sending traffic on each path; determine the optimal utilization of each path based on the initial sending traffic on each path and the fair bandwidth of each path; determine the allocated traffic on each path based on the optimal utilization of each path and the fair bandwidth of each path; determine the traffic adjustment amount of each path based on the initial sending traffic on each path and the allocated traffic on each path; and determine the to-be-sent traffic on each path based on the traffic adjustment amount of each path and the initial sending traffic on each path.

In a possible implementation, the determining module 13 is specifically configured to calculate a sum of a traffic adjustment amount of a first path and initial sending traffic on the first path to obtain to-be-sent traffic on the first path. The first path is any path of the at least two paths.

In a possible implementation, the determining module 13 is specifically configured to calculate a difference between allocated traffic on the first path and the initial sending traffic on the first path to obtain the traffic adjustment amount of the first path. The first path is any path of the at least two paths.

In a possible implementation, the determining module 13 is specifically configured to calculate a product of the optimal utilization of each path and a fair bandwidth of the first path to obtain the allocated traffic on the first path. The first path is any path of the at least two paths.

In a possible implementation, the determining module 13 is specifically configured to: calculate a sum of initial sending traffic on all paths to obtain total sending traffic; calculate a sum of fair bandwidths of all the paths to obtain a total fair bandwidth; and calculate a quotient of the total sending traffic and the total fair bandwidth to obtain the optimal utilization of each path.

In a possible implementation, the determining module 13 is specifically configured to: calculate a quotient of receiving traffic on the first path and sending traffic on a link of the first path to obtain a first ratio, where the first path is any path of the at least two paths; and calculate a product of the first ratio and a bandwidth of the first path to obtain the fair bandwidth of the first path.

In a possible implementation, the determining module 13 is specifically configured to calculate a quotient of the receiving traffic on the first path and link utilization of the link of the first path to obtain the fair bandwidth of the first path.

In a possible implementation, the measurement packet includes sending traffic on the link and the bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

In a possible implementation, the measurement packet includes the link utilization of the link, and the link utilization is the ratio of the sending traffic on the link to the bandwidth of the link. In addition, the measurement packet further includes at least one of the initial sending traffic on the path, the path identifier, or the first timestamp.

In a possible implementation, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

Figure 9:
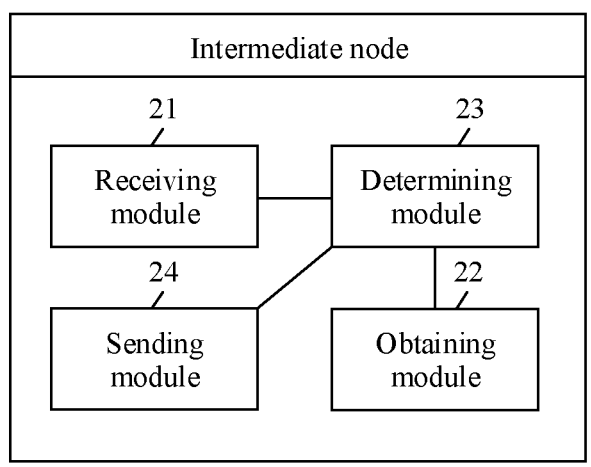
FIG. 9 is a schematic diagram of an intermediate node according to an embodiment of this application.

FIG. 9 is a schematic diagram of an intermediate node according to an embodiment of this application. The intermediate node shown in FIG. 9 includes the following modules.

A receiving module 21 is configured to receive a measurement packet on a first path of at least two paths. The at least two paths are paths between an ingress node and an egress node, and the measurement packet is used to indicate information about a first link of the first path.

An obtaining module 22 is configured to obtain information about a second link. The second link is a link connected to an egress port of the intermediate node on the first path.

A determining module 23 is configured to: when it is determined, based on information about the first link and information about the second link, that link utilization of the first link is greater than or equal to link utilization of the second link, invoke a sending module 24 to send the measurement packet to the egress node, where the link utilization is used to indicate traffic usage of the link; and when it is determined, based on the information about the first link and the information about the second link, that the link utilization of the first link is less than the link utilization of the second link, fill the information about the second link in the measurement packet, and invoke the sending module 24 to send the measurement packet to the egress node.

The sending module 24 is configured to send the measurement packet to the egress node.

For specific and detailed implementations of the receiving module 21, the obtaining module 22, the determining module 23, and the sending module 24, refer to the detailed description of S102 and S103 in the method embodiment shown in FIG. 3.

In a possible implementation, the information about the first link includes sending traffic on the first link and a bandwidth of the first link, and the information about the second link includes sending traffic on the second link and a bandwidth of the second link. Alternatively, the information about the first link includes the link utilization of the first link, and the information about the second link includes the link utilization of the second link.

In a possible implementation, the determining module 23 is further configured to delete a first measurement packet.

In a possible implementation, the measurement packet includes sending traffic on a link and a bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

In a possible implementation, the measurement packet includes the link utilization of the link, and the link utilization is the ratio of the sending traffic on the link to the bandwidth of the link. In addition, the measurement packet further includes at least one of the initial sending traffic on the path, the path identifier, or the first timestamp.

Figure 10:
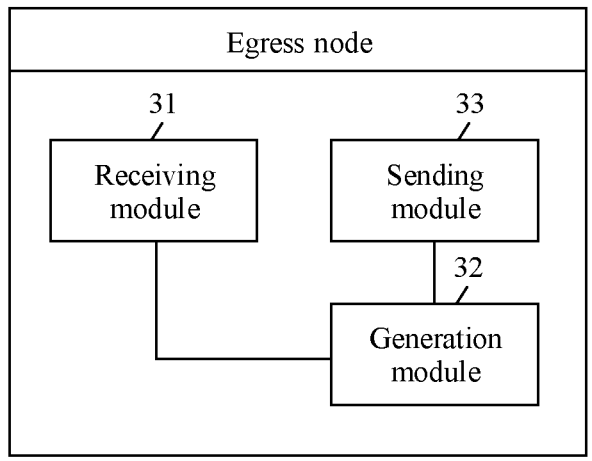
FIG. 10 is a schematic diagram of an egress node according to an embodiment of this application.

FIG. 10 is a schematic diagram of an egress node according to an embodiment of this application. The egress node shown in FIG. 10 includes the following modules.

A receiving module 31 is configured to receive, on each of at least two paths, a measurement packet sent by an ingress node. The at least two paths are paths between the ingress node and the egress node, and the measurement packet on each path is used to indicate path information of each path.

A generation module 32 is configured to generate a response packet based on the path information of each path and receiving traffic on each path. The response packet is used to indicate traffic adjustment information of each path.

A sending module 33 is configured to send the response packet to the ingress node.

For specific and detailed implementations of the receiving module 31, the generation module 32, and the sending module 33, refer to the detailed description of S104 to S108 in the method embodiment shown in FIG. 3.

In a possible implementation, the generation module 32 is specifically configured to: determine a fair bandwidth of each path based on information about a link of each path and the receiving traffic on each path; and generate the response packet. The response packet includes the fair bandwidth of each path.

In a possible implementation, the generation module 32 is specifically configured to: determine the fair bandwidth of each path based on the information about the link of each path and the receiving traffic on each path; obtain initial sending traffic on each path; determine optimal utilization of each path based on the initial sending traffic on each path and the fair bandwidth of each path; and generate the response packet. The response packet includes the optimal utilization of each path and the fair bandwidth of each path.

In a possible implementation, the generation module 32 is specifically configured to: determine the fair bandwidth of each path based on the information about the link of each path and the receiving traffic on each path; obtain the initial sending traffic on each path; determine the optimal utilization of each path based on the initial sending traffic on each path and the fair bandwidth of each path; determine allocated traffic on each path based on the optimal utilization of each path and the fair bandwidth of each path; and generate the response packet. The response packet includes the allocated traffic on each path.

In a possible implementation, the generation module 32 is specifically configured to: determine the fair bandwidth of each path based on the information about the link of each path and the receiving traffic on each path; obtain the initial sending traffic on each path; determine the optimal utilization of each path based on the initial sending traffic on each path and the fair bandwidth of each path; determine the allocated traffic on each path based on the optimal utilization of each path and the fair bandwidth of each path; determine a traffic adjustment amount of each path based on the initial sending traffic on each path and the allocated traffic on each path; and generate a response packet. The response packet includes the traffic adjustment amount of each path.

In a possible implementation, the generation module 32 is specifically configured to determine a fair bandwidth of a first path based on information about a link of the first path and receiving traffic on the first path by calculation. The first path is any path of the at least two paths.

In a possible implementation, the generation module 32 is specifically configured to: calculate a sum of initial sending traffic on all paths to obtain total sending traffic; calculate a sum of fair bandwidths of all the paths to obtain a total fair bandwidth; and calculate a quotient of the total sending traffic and the total fair bandwidth to obtain the optimal utilization of each path.

In a possible implementation, the generation module 32 is specifically configured to calculate a product of the optimal utilization of each path and the fair bandwidth of the first path to obtain allocated traffic on the first path. The first path is any path of the at least two paths.

In a possible implementation, the generation module 32 is specifically configured to calculate a difference between the allocated traffic on the first path and initial sending traffic on the first path to obtain traffic adjustment amount of the first path. The first path is any path of the at least two paths.

In a possible implementation, the measurement packet includes sending traffic on a link and a bandwidth of the link. The sending traffic on the link is accumulated sending traffic on the link in a first time period, and the bandwidth of the link is a bandwidth of the link in the first time period. In addition, the measurement packet further includes at least one of initial sending traffic on a path, a path identifier, or a first timestamp. The first timestamp is a sending time of the measurement packet, and the initial sending traffic on the path is accumulated sending traffic on the path in a second time period, or the initial sending traffic on the path is accumulated sending traffic on the path corresponding to the first timestamp.

In a possible implementation, the measurement packet includes link utilization of the link, and the link utilization is the ratio of the sending traffic on the link to the bandwidth of the link. In addition, the measurement packet further includes at least one of the initial sending traffic on the path, the path identifier, or the first timestamp.

In a possible implementation, the response packet further includes at least one of the path identifier, the first timestamp, a second timestamp, a third timestamp, receiving traffic on the path, the link utilization of the link, the sending traffic on the link, or the bandwidth of the link. The second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

Figure 11:
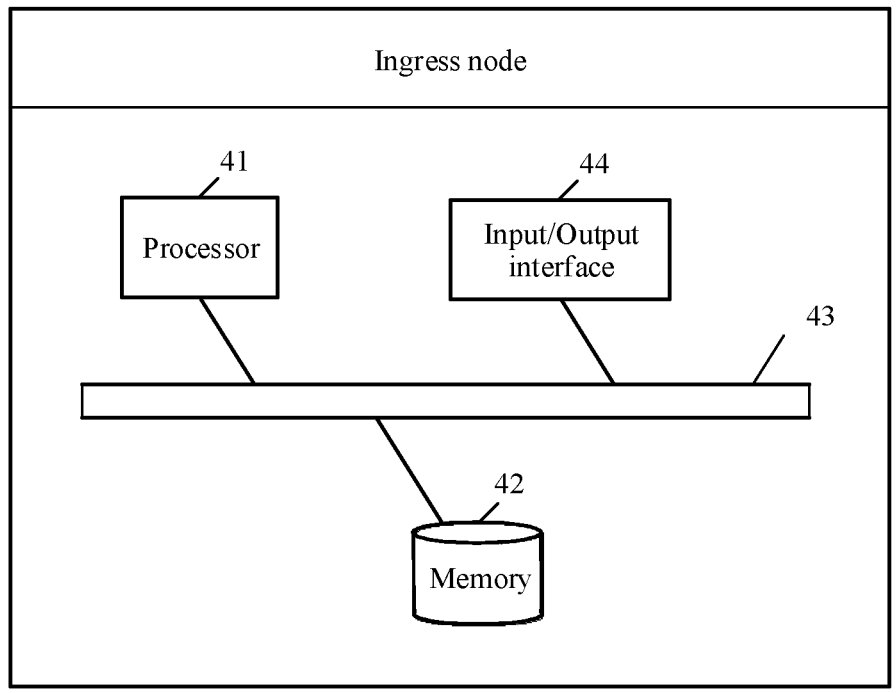
FIG. 11 is a schematic diagram of another ingress node according to an embodiment of this application.

FIG. 11 is a schematic diagram of another ingress node according to an embodiment of this application. The ingress node shown in FIG. 11 includes a processor 41, a memory 42, a bus 43, and an input/output interface 44.

The input/output interface 44 of the terminal device may send a measurement packet to an egress node on each of at least two paths, and receive a response packet sent by the egress node. The bus 43 may transmit the response packet received by the input/output interface 44 to the memory 42. The processor 41 may obtain the response packet from the memory 42, and determine to-be-sent traffic on each path based on traffic adjustment information of each path in the response packet. The ingress node shown in FIG. 11 is equivalent to the ingress node mentioned in FIG. 2 to FIG. 10. For the ingress node in FIG. 11, refer to detailed description of the ingress node in embodiments corresponding to FIG. 2 to FIG. 10.

Figure 12:
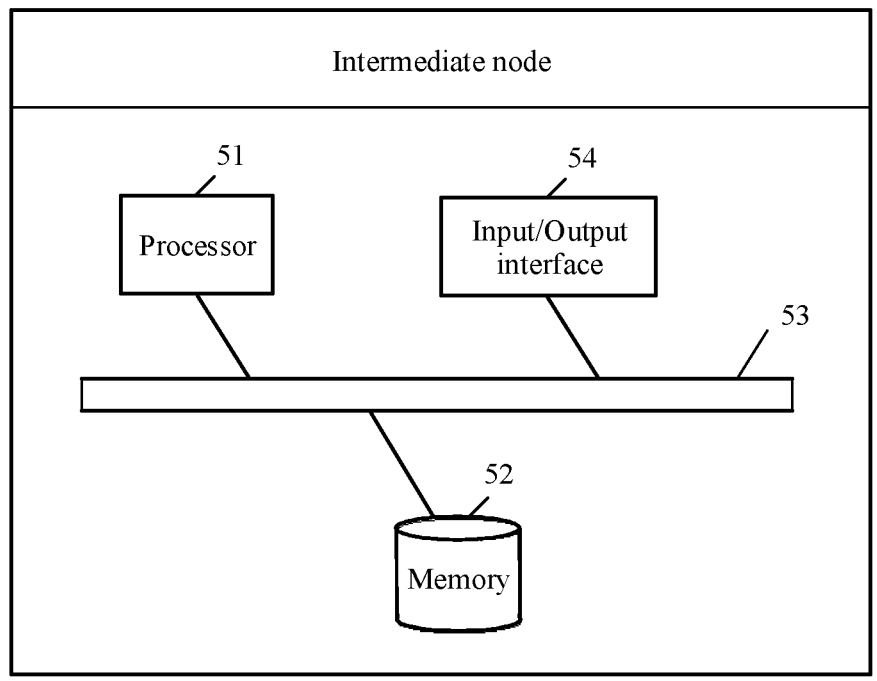
FIG. 12 is a schematic diagram of another intermediate node according to an embodiment of this application.

FIG. 12 is a schematic diagram of another intermediate node according to an embodiment of this application. The intermediate node shown in FIG. 12 includes a processor 51, a memory 52, a bus 53, and an input/output interface 54.

The input/output interface 54 of the intermediate node may receive a measurement packet on a first path of at least two paths, and obtain information about a second link. The bus 53 may transmit, to the memory 52, the measurement packet and the information about the second link that are received by the input/output interface 54. The processor 51 may obtain, from the memory 52, information about the first link and the information about the second link in the measurement packet; when it is determined, based on the information about the first link and the information about the second link, that link utilization of the first link is greater than or equal to link utilization of the second link, invoke the input/output interface 54 to send the measurement packet to an egress node; and when it is determined, based on the information about the first link and the information about the second link, that the link utilization of the first link is less than the link utilization of the second link, fill the information about the second link in the measurement packet, and invoke the input/output interface 54 to send the measurement packet to the egress node. The intermediate node shown in FIG. 12 is equivalent to the intermediate node mentioned in FIG. 2 to FIG. 10. For the intermediate node in FIG. 12, refer to the detailed description of the intermediate node in embodiments corresponding to FIG. 2 to FIG. 10.

Figure 13:
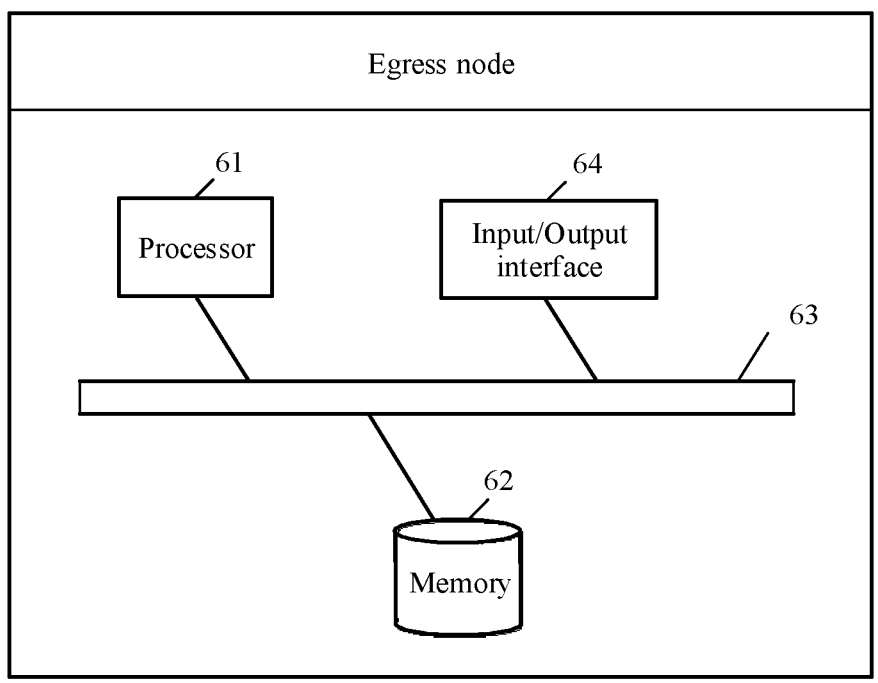
FIG. 13 is a schematic diagram of another egress node according to an embodiment of this application.

FIG. 13 is a schematic diagram of another egress node according to an embodiment of this application. The egress node shown in FIG. 13 includes a processor 61, a memory 62, a bus 63, and an input/output interface 64.

The input/output interface 64 of the egress node may receive, on each of at least two paths, a measurement packet sent by an ingress node, and send a response packet to the ingress node. The bus 63 may transmit the measurement packet received by the input/output interface 64 to the memory 62. The processor 61 may obtain path information of each path and receiving traffic on each path from the memory 62, and generate the response packet based on the path information of each path and the receiving traffic on each path. The egress node shown in FIG. 13 is equivalent to the egress node mentioned in FIG. 2 to FIG. 10. For the egress node in FIG. 13, refer to detailed description of the egress node in embodiments corresponding to FIG. 2 to FIG. 10.

Figure 14:
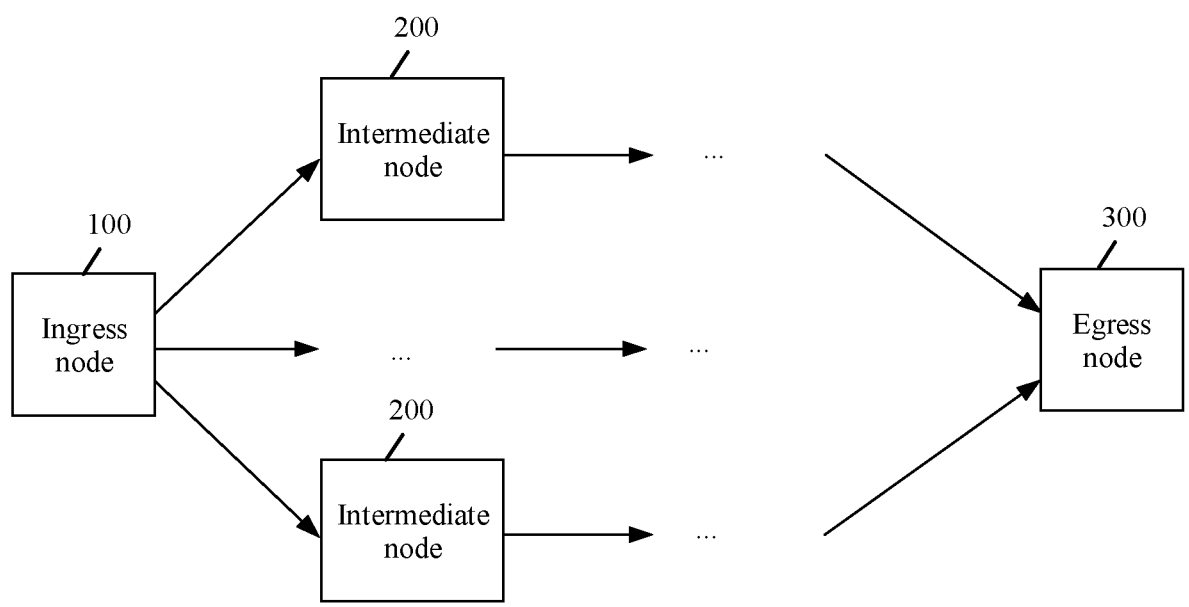
FIG. 14 is a schematic diagram of a network system according to an embodiment of this application.

FIG. 14 is a schematic diagram of a network system according to an embodiment of this application. The network system shown in FIG. 14 includes an ingress node 100, an intermediate node 200, and an egress node 300.

For a specific structure of the ingress node 100 shown in FIG. 14, refer to the ingress node shown in FIG. 8 and the ingress node shown in FIG. 11. For a specific structure of the intermediate node 200 shown in FIG. 14, refer to the intermediate node shown in FIG. 9 and the intermediate node shown in FIG. 12. For a specific structure of the egress node 300 shown in FIG. 14, refer to the egress node shown in FIG. 10 and the egress node shown in FIG. 13.

It should be noted that, when there is a function implemented by software in the foregoing embodiments, related software or a module in the software may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and disc (disc) used by this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In addition, the foregoing embodiments are merely intended to describe the technical solutions in this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof.

What is claimed is:

1. A path traffic allocation method, comprising:
   sending, by an ingress node, a measurement packet to an egress node on each of at least two paths, wherein the at least two paths are paths between the ingress node and the egress node, and the measurement packet on each path indicates path information of each path;
   receiving, by the ingress node, a response packet from the egress node in response to the sent measurement packet, wherein the response packet indicates traffic adjustment information of each path, and the response packet includes receiving traffic on each path and information about a link of each path;

determining, by the ingress node, the fair bandwidth of each path based on the receiving traffic on each path and the information about the link of each path;

obtaining, by the ingress node, initial sending traffic on each path;

determining, by the ingress node, optimal utilization of each path based on the initial sending traffic on each path and the fair bandwidth of each path;

determining, by the ingress node, allocated traffic on each path based on the optimal utilization of each path and the fair bandwidth of each path;

determining, by the ingress node, the traffic adjustment information of each path based on the initial sending traffic on each path and the allocated traffic on each path; and determining, by the ingress node, to-be-sent traffic on each path based on the traffic adjustment information of each path and the initial sending traffic on each path.

2. The method according to claim 1, wherein the response packet comprises a traffic adjustment amount of each path, and the traffic adjustment amount of each path indicates traffic that needs to be adjusted on each path, and wherein the determining, by the ingress node, the to-be-sent traffic on each path based on the traffic adjustment information of each path and the initial sending traffic on each path comprises:

determining, by the ingress node, the to-be-sent traffic on each path based on the traffic adjustment amount of each path and the initial sending traffic on each path.

3. The method according to claim 1, wherein the response packet comprises the allocated traffic on each path, and the allocated traffic on each path indicates sending traffic on a link of each path, and wherein the determining, by the ingress node, the to-be-sent traffic on each path based on the traffic adjustment information of each path and the initial sending traffic on each path comprises:

determining, by the ingress node, a traffic adjustment amount of each path based on the initial sending traffic on each path and the allocated traffic on each path; and determining, by the ingress node, the to-be-sent traffic on each path based on the traffic adjustment amount of each path and the initial sending traffic on each path.

4. The method according to claim 1, wherein the measurement packet comprises sending traffic and a bandwidth of a link, the sending traffic on the link is accumulated sending traffic on the link in a first time period, and the bandwidth of the link is a bandwidth of the link in the first time period, or the measurement packet comprises link utilization of the link, and the link utilization is a ratio of the sending traffic on the link to the bandwidth of the link, or the measurement packet comprises the sending traffic and the bandwidth of the link, the measurement packet further comprises at least one of initial sending traffic on a path, a path identifier, or a first timestamp, the first timestamp is a sending time of the measurement packet, and the initial sending traffic on the path is accumulated sending traffic on the path in a second time period, or the initial sending traffic on the path is accumulated sending traffic on the path corresponding to the first timestamp, or the measurement packet comprises the link utilization of the link, and the measurement packet further comprises at least one of the initial sending traffic on the path, the path identifier, or the first timestamp.

5. The method according to claim 4, wherein the response packet further comprises at least one of the path identifier, the first timestamp, a second timestamp, a third timestamp, receiving traffic on the path, the link utilization of the link, the sending traffic on the link, or the bandwidth of the link, the second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

6. A path traffic allocation method, comprising:

receiving, by an egress node, a measurement packet from an ingress node on each of at least two paths, wherein the at least two paths are paths between the ingress node and the egress node, and the measurement packet on each path indicates path information of each path;

determining, by the egress node, a fair bandwidth of each path based on information about a link of each path and receiving traffic on each path;

obtaining, by the egress node, initial sending traffic on each path;

determining, by the egress node, optimal utilization of each path based on the initial sending traffic on each path and the fair bandwidth of each path;

determining, by the egress node, allocated traffic on each path based on the optimal utilization of each path and the fair bandwidth of each path;

generating, by the egress node, a response packet in response to the received measurement packet based on the path information of each path and receiving traffic on each path, wherein the response packet indicates traffic adjustment information of each path, and wherein the response packet includes the allocated traffic on each path; and sending, by the egress node, the response packet to the ingress node.

7. The method according to claim 6, wherein the measurement packet comprises sending traffic and a bandwidth of a link, the sending traffic on the link is accumulated sending traffic on the link in a first time period, and the bandwidth of the link is a bandwidth of the link in the first time period, or the measurement packet comprises link utilization of the link, and the link utilization is a ratio of the sending traffic on the link to the bandwidth of the link, or the measurement packet comprises the sending traffic and the bandwidth of the link, the measurement packet further comprises at least one of initial sending traffic on a path, a path identifier, or a first timestamp, the first timestamp is a sending time of the measurement packet, and the initial sending traffic on the path is accumulated sending traffic on the path in a second time period, or the initial sending traffic on the path is accumulated sending traffic on the path corresponding to the first timestamp, or the measurement packet comprises the link utilization of the link, and the measurement packet further comprises at least one of the initial sending traffic on the path, the path identifier, or the first timestamp.

8. The method according to claim 6, wherein the generating, by the egress node, the response packet based on the path information of each path and receiving traffic on each path comprises:

determining, by the egress node, a fair bandwidth of each path based on information about a link of each path and the receiving traffic on each path;
obtaining, by the egress node, initial sending traffic on each path;
determining, by the egress node, optimal utilization of each path based on the initial sending traffic on each path and the fair bandwidth of each path;
determining, by the egress node, allocated traffic on each path based on the optimal utilization of each path and the fair bandwidth of each path;
determining, by the egress node, a traffic adjustment amount of each path based on the initial sending traffic on each path and the allocated traffic on each path; and
generating, by the egress node, the response packet, wherein the response packet comprises the traffic adjustment amount of each path.

9. The method according to claim 6, wherein:
the response packet further comprises at least one of the path identifier, the first timestamp, a second timestamp, a third timestamp, receiving traffic on the path, the link utilization of the link, the sending traffic on the link, or the bandwidth of the link, the second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

10. An ingress node, comprising:
one or more processors; and
a non-transitory computer-readable memory storing a program including instructions that,
when executed by the one or more processors, cause the ingress node to:
send a measurement packet to an egress node on each of at least two paths, wherein the at least two paths are paths between the ingress node and the egress node, and the measurement packet on each path indicates path information of each path;
receive a response packet from the egress node in response to the sent measurement packet, wherein the response packet indicates traffic adjustment information of each path, and the response packet includes receiving traffic on each path and information about a link of each path;
determine the fair bandwidth of each path based on the receiving traffic on each path and the information about the link of each path;
obtain initial sending traffic on each path;
determine optimal utilization of each path based on the initial sending traffic on each path and the fair bandwidth of each path;
determine allocated traffic on each path based on the optimal utilization of each path and the fair bandwidth of each path;
determine the traffic adjustment information of each path based on the initial sending traffic on each path and the allocated traffic on each path; and
determine to-be-sent traffic on each path based on the traffic adjustment information of each path and the initial sending traffic on each path.

11. The ingress node according to claim 10, wherein the response packet comprises a traffic adjustment amount of each path, and the traffic adjustment amount of each path indicates traffic that needs to be adjusted on each path, and
wherein the program further includes instructions that, when executed by the one or more processors, cause the ingress node to:
determine the to-be-sent traffic on each path based on the traffic adjustment amount of each path and the initial sending traffic on each path.

12. The ingress node according to claim 10, wherein the response packet comprises allocated traffic on each path, and the allocated traffic on each path indicates sending traffic on a link of each path, and wherein the program further includes instructions that, when executed by the one or more processors, cause the ingress node to:
determine a traffic adjustment amount of each path based on the initial sending traffic on each path and the allocated traffic on each path; and
determine the to-be-sent traffic on each path based on the traffic adjustment amount of each path and the initial sending traffic on each path.

13. The ingress node according to claim 10, wherein
the measurement packet comprises sending traffic and a bandwidth of a link, the sending traffic on the link is accumulated sending traffic on the link in a first time period, and the bandwidth of the link is a bandwidth of the link in the first time period, or
the measurement packet comprises link utilization of the link, and the link utilization is a ratio of the sending traffic on the link to the bandwidth of the link, or
the measurement packet comprises the sending traffic and the bandwidth of the link, the measurement packet further comprises at least one of initial sending traffic on a path, a path identifier, or a first timestamp, the first timestamp is a sending time of the measurement packet, and the initial sending traffic on the path is accumulated sending traffic on the path in a second time period, or the initial sending traffic on the path is accumulated sending traffic on the path corresponding to the first timestamp, or
the measurement packet comprises the link utilization of the link, and the measurement packet further comprises at least one of the initial sending traffic on the path, the path identifier, or the first timestamp.

14. The ingress node according to claim 13, wherein
the response packet further comprises at least one of the path identifier, the first timestamp, a second timestamp, a third timestamp, receiving traffic on the path, the link utilization of the link, the sending traffic on the link, or the bandwidth of the link, the second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

15. An egress node, comprising:
one or more processors; and
a non-transitory computer-readable memory storing a program including instructions that,
when executed by the one or more processors, cause the egress node to:
receive a measurement packet sent by an ingress node on each of at least two paths, wherein the at least two paths are paths between the ingress node and the egress node, and the measurement packet on each path is used to indicate path information of each path;

determine a fair bandwidth of each path based on information about a link of each path and receiving traffic on each path;

obtain initial sending traffic on each path;

determine optimal utilization of each path based on the initial sending traffic on each path and the fair bandwidth of each path;

determine allocated traffic on each path based on the optimal utilization of each path and the fair bandwidth of each path;

generate a response packet in response to the received measurement packet based on the path information of each path and receiving traffic on each path, wherein the response packet indicates traffic adjustment information of each path, and wherein the response packet includes the allocated traffic on each path; and send the response packet to the ingress node.

16. The egress node according to claim 15, wherein the measurement packet comprises sending traffic and a bandwidth of a link, the sending traffic on the link is accumulated sending traffic on the link in a first time period, and the bandwidth of the link is a bandwidth of the link in the first time period, or the measurement packet comprises link utilization of the link, and the link utilization is a ratio of the sending traffic on the link to the bandwidth of the link, or the measurement packet comprises the sending traffic and the bandwidth of the link, the measurement packet further comprises at least one of initial sending traffic on a path, a path identifier, or a first timestamp, the first timestamp is a sending time of the measurement packet, and the initial sending traffic on the path is accumulated sending traffic on the path in a second time period, or the initial sending traffic on the path is accumulated sending traffic on the path corresponding to the first timestamp, or the measurement packet comprises the link utilization of the link, and the measurement packet further comprises at least one of the initial sending traffic on the path, the path identifier, or the first timestamp.

17. The egress node according to claim 15, wherein the program further includes instructions that, when executed by the one or more processors, cause the node to:

determine a fair bandwidth of each path based on information about a link of each path and the receiving traffic on each path;

determine optimal utilization of each path based on the initial sending traffic on each path and the fair bandwidth of each path;

determine allocated traffic on each path based on the optimal utilization of each path and the fair bandwidth of each path;

determine a traffic adjustment amount of each path based on the initial sending traffic on each path and the allocated traffic on each path; and generate the response packet, wherein the response packet comprises the traffic adjustment amount of each path.

18. The egress node according to claim 15, wherein the response packet further comprises at least one of the path identifier, the first timestamp, a second timestamp, a third timestamp, receiving traffic on the path, the link utilization of the link, the sending traffic on the link, or the bandwidth of the link, the second timestamp is a receiving time of the measurement packet, the third timestamp is a sending time of the response packet, the receiving traffic on the path is accumulated receiving traffic on the path in a third time period, or the receiving traffic on the path is accumulated receiving traffic on the path corresponding to the second timestamp, and the third time period is later than or equal to the second time period.

* * * * *